United States Patent
Richter et al.

(10) Patent No.: US 6,613,583 B1
(45) Date of Patent: Sep. 2, 2003

(54) ELECTROCHEMILUMINESCENT LABEL BASED ON MULTIMETALLIC ASSEMBLIES

(75) Inventors: Mark M. Richter, Springfield, MO (US); Allen J. Bard, Austin, TX (US); Russel H. Schmehl, New Orleans, LA (US)

(73) Assignee: IGEN International, Inc., Gaithersburg, MD (US)

( * ) Notice: Subject to any disclaimer, the term of this patent is extended or adjusted under 35 U.S.C. 154(b) by 0 days.

(21) Appl. No.: 09/105,524

(22) Filed: Jun. 26, 1998

Related U.S. Application Data

(60) Provisional application No. 60/051,341, filed on Jun. 27, 1997.

(51) Int. Cl.$^7$ ............... G01N 33/532; G01N 33/78; G01N 33/554; C07K 17/06; C12Q 1/68
(52) U.S. Cl. ............... 436/544; 435/6; 436/500; 436/519; 436/806; 436/815; 436/816; 436/817; 530/391.3; 530/391.5; 530/402
(58) Field of Search ............... 436/544, 500, 436/817, 815, 816, 519, 806; 530/391.3, 391.5, 402; 435/6

(56) References Cited

U.S. PATENT DOCUMENTS

| | | |
|---|---|---|
| 5,221,605 A | 6/1993 | Bard et al. ............ 435/4 |
| 5,238,808 A | 8/1993 | Bard et al. ............ 435/4 |
| 5,310,687 A | 5/1994 | Bard et al. ............ 436/518 |
| 5,324,457 A | 6/1994 | Zhang et al. ............ 252/700 |
| 5,453,356 A | 9/1995 | Bard et al. ............ 435/6 |
| 5,641,623 A | 6/1997 | Martin ............ 435/4 |
| 5,643,713 A | 7/1997 | Liang et al. ............ 435/4 |
| 5,714,089 A | 2/1998 | Bard et al. ............ 252/301.18 |
| 5,731,147 A | 3/1998 | Bard et al. ............ 435/6 |
| 5,786,141 A | 7/1998 | Bard et al. ............ 435/6 |

FOREIGN PATENT DOCUMENTS

| | | |
|---|---|---|
| WO | WO 87/06706 | 11/1987 |

OTHER PUBLICATIONS

Neyhart et al, Chem. Abstract No. 106: 24896, 1986.*
Schanze et al, Chem. Abstract No. 104: 198750, 1986.*
Ershov et al, Chem. Abstrat No. 122: 176978, 1994.*
Loeb et al, Chem. Abstract No. 110: 66072, 1989.*
Schanze et al, Chem. Abstract No. 104: 45639, 1986.*
Dubicki et al., "Electronic Absorption and MCD Spectra of Mononuclear and Binuclear Complexes of Osmium (III) Ammines with π–Bonding Aromatic Ligands: Complexes with $C_{2v}$ and $D_{2h}$ Symmetry", *The Journal of Physical Chemistry*, vol. 88, No. 1, pp. 3940–3941.
Abst: 103:192957g, *Chemical Abstracts Service*, Dec. 9, 1985, vol. 103, No. 23.
G. Jia et al., "Dimeric and polymeric ruthenium complexes with Ru–vinyl linkages", *Journal of Organometallic Chemistry*, vol. 539, (1997) pp. 53–59.

S. Siddiqui et al., "Pentacyanoruthenate(II)–Pentaammineruthenium(II/III) Binuclear Complexes Bridged by Cyanogen, Cyanide, and 4,4'–Bipyridine", *Inorg. Chem.*, (1987) vol. 26, No. 19, pp. 3101–3107.
Sutton et al., "Metal to Metal Interactions in Weakly Coupled Mixed–Valence Complexes Based on Ruthenium Ammines", *Inorg. Chem,*, Oct. 1981, vol. 20, No. 10, pp. 3124–3134.
"Influence of Bridging Ligand Unsaturation on Excited State Behavior in Mono– and Bimetallic Ruthenium(II) Diimine Complexes", Baba, et al., *Inorg. Chem.*, vol. 34, pp. 1198–1207, (1995) [First Page with Abstract].
"Mononuclear and Dinuclear Osmium(II) Compounds Containing 2,2'–Bipyridine and 3,5–Bis(pyridin–2–yl)–1,2, 4–triazole: Synthesis, Electrochemistry, Absorption Spectra, and Luminescence Properties", Barigelletti, et al., *Inorg. Chem.*, vol. 30, pp. 641–645, (1991) [First Page with Abstract].
"Electrogenerated Chemiluminescence. IX. Electrochemistry and Emission from Systems Containing Tris(2,2'–bipyridine)ruthenium(II) Dichloride", Tokel et al., *J. Am. Chem. Soc.*, vol. 94, No. 8, pp. 2862, (Apr. 19, 1972) [First Page].
"Electrochemiluminescence of Tetrakis(diphosphonato)diplatinated(II)", Vogler et al., *Angew. Chem. Int. Ed. Engl.*, vol. 23, No. 4, pp. 316, (1984) [First Page].
"Electrogenerated Chemiluminescence. 35. Temperature Dependence of the ECL Efficiency of $Ru(bpy)_3^{2+}$ in Acetronile and Evidence for Very High Excited State Yields from Electron Transfer Reactions", Wallace et al., *J. Phys. Chem.*, vol. 83, No. 10, pp. 1350, (1979) [First Page with Abstract].
"Electron Transfer Quenching of the Luminescent Excited State of Tris(2,2'–bipyridine)ruthenium(II). A Flash Photolysis Relaxation Technique for Measuring the Rates of Very Rapid Electron Transfer Reactions", Bock,e t al.,*J. Am. Chem. Soc.*, vol. 96, No. 14 pp. 4710, (Jul. 10, 1974) [First Page].
"Estimation of Excited–State Redox Potentials by Electron–Transfer Quenching. Application of Electron–Transfer Theory to Excited–State Redox Processes", Bock, et al.,*Am. Chem. Soc.*, vol. 101, pp. 4815, (1979) [First Page with Abstract].

(List continued on next page.)

*Primary Examiner*—Mary E. Ceperley
(74) *Attorney, Agent, or Firm*—Barry Evans, Esq.; Kramer Levin Naftalis & Frankel LLP

(57) ABSTRACT

Electrochemiluminescent label compounds containing multimetallic centers separated by bridging ligands are described. An example of a multimetallic electrochemiluminescent label suitable for use in electrochemiluminescence (ECL) methods, $[(bpy)_2Ru]_2(bphb)^{4+}$, demonstrates ECL efficiencies 2 to 3 times greater than those for $Ru(bpy)_3^{2+}$ in acetonitrile and aqueous media. Such multimetallic ECL compounds may be especially useful in the design of new labels for bioanalytical applications, such as immunoassays and DNA probes.

117 Claims, 6 Drawing Sheets

OTHER PUBLICATIONS

"Spectroscopic and Electrochemical Properties of the Dimer Tetrakis(2,2'-bipyridine)($\mu$-2, 3-bis(2-pyridyl)pyrazine)diruthenium(II) and Its Monomeric Analogue", Braunstein, et al., *Inorg. Chem.*, vol. 23, pp. 857–864, (1984) [First Page with Abstract].

"Intervalence Transfer in Unsymmetrical, Ligand–Bridged Dimeric Complexes of Ruthenium", Callahan, et al., *J. Am. Chem. Soc.*, pp. 7829, (1974) [First Page].

"Effects of Weak Metal–Metal Interactions in Ligand–Bridged Complexes of Ruthenium. Dimeric Complexes Containing Ruthenium Ions in Different Coordination Environments", Callahan, et al., *Am. Chem. Soc.*, vol. 14, No. 7, pp. 1443, (1975) [First Page with Abstract].

"A Direct Approach to Measuring the Franck–Condon Barrier to Electron Transfer between Metal Ions", Creutz and Taube, *J. Am. Chem. Soc.*, vol. 91, No. 14, pp. 3988, (Jul. 2, 1969) [First Page].

"Binuclear Complexes of Ruthenium Ammines", Creutz et al., *J. Amer. Chem. Soc.*, vol. 95, No. 4, pp. 1086, (Feb. 21, 1973) [First Page with Abstract].

"Quantum Efficiencies on Transition Metal Complexes. II. Charge–Transfer Luminescence", Demas, et al., *J. Am. Chem. Soc.*, vol. 93, pp. 2841, (1971) [First Page with Abstract].

"Synthesis and Electrochemical and Photoemission Properties of Mononuclear and Binuclear Ruthenium(II) Complexes Containing 2,2'–Bipyridine, 2,9–Dimethyl–1, 10–phenanthroline, 2,2'–Bipyrimidine, 2,2'–Biimidazole, and 2–Pyridinecarboxaldimine Ligands", Dose, et al., *Inorg. Chem.*, vol. 17, No. 9, (1978) [First Page with Abstract].

"The Electronic Structure of N,N'-Bis[pentaammineruthenium(II,III)] pyrazine(5+)", Elias, et al., *Inorg Chem.*, vol. 11, No. 2, pp. 415, (1972) [First Page].

"Electrochemiluminescence", Faulkner et al., *Chemical and Biological Generation of Excited States*, Academic Press, p. 91, (1982) [First Page].

"Intervalence Transfer in Mixed–Metal Dimers of Ruthenium and Osmium: Relationship between Redox Asymmetry and Intervalence–Transfer Absorption Band Energy", Goldsby et al., *Inorg. Chem.*, vol. 23, pp. 3002–3010, (1984) [First Page with Abstract].

"Synthesis, X–ray Structure, and Spectroscopic and Electrochemical Properties of Novel Heteronuclear Ruthenium–Osmium Complexes with an Asymmetric Triazolate Bridge", Hage et al., *J. Am. Chem. Soc.*, vol. 112, pp. 9245–9251, (1990) [First Page with Abstract].

"Electrogenerated Chemiluminescence. On the Electrogenerated Chemiluminescence (ECL) of Tetrakis(Pyrophosphito)Diplatinate(II), $Pt_2(P_2O_5H_2)^{4-}{}_4$," Kim et al., *Chem. Phys. Letters*, vol. 121, No. 6, pp. 543, (Nov. 22, 1985) [First Page with Abstract].

"Occurrence, Mechanisms and Analytical Applications of Electrogenerated Chemiluminescence", Knight et al., *Analyst*, vol. 119, (May 1994) [First Page with Abstract].

"Binuclear Mixed Valence Rutheniumammine Complexes with tert–Butylmalononitrile as Bridging Ligand", Krentzien et al., *Am. Chem. Soc.*, vol. 98, pp. 6379, (1979) [First Page].

"Electrogenerated Chemiluminesence XXIII. On the Operation and Lifetime of ECL Devices", Laser, et al., *J. Electrochem. Soc.: Electrochemical Science and Technology*, vol. 122, pp. 632, (May 1975) [First Page with Abstract].

"Electrogenerated chemiluminescence Part 54. Electrogenerated chemiluminescence of ruthenium(II) 4,4'–diphenyl–2,2'–bipyridine and ruthenium(II) 4,7–diphenyl–1, 10–phenanthroline systems in aqueous and acetronitrile solutions", McCord, et al., *J. Electroanal. Chem.*, vol. 318, pp. 91–99, (1991) [First Page with Abstract].

"Optical and Thermal Electron Transfer in Metal Complexes", Meyer, *Acc. Chem. Res.*, vol. 11, pp. 94, (1978) [First Page].

"Partitioning of the Electrochemical Excitation Energy in the Electrogenerated Chemiluminescence of Hexanuclear Molybdenum and Tungsten Clusters", Mussell, et al., *Inorg. Chem.*, vol. 29, pp. 3711–3717, (1990) [First Page with Abstract].

"Mechanism of the Quenching of the Phosphorescence of Tris(2,2'–bipyridine)ruthenium(II) by Some Cobalt(III) and Ruthenium(III)Complexes", Navon et al., *Inorg. Chem.* vol. 13, No. 9, pp. 2159, (1974) [First Page with Abstract].

"Electrochemistry and Electrogenerated Chemiluminescence of $Mo_2Cl_4(PMe_3)_4$", Ouyang et al., *J. Phys. Chem.*, vol. 90, pp. 3841–3844, (1986) [First Page with Abstract].

"Intervalence Transfer in Ligand–Bridged, Trimeric Complexes of Ruthenium", Powers et al., *Inorg. Chem.*, vol. 15, No. 4, (1976) [First Page with Abstract].

"Electrogenerated Chemiluminescence. 57. Emission from Sodium 9,10–Diphenylanthracene–2–sulfonate, Thianthrenencarboxylic Acids, and Chloropromazine in Aqueous Media", Richards, et al., *Anal Chem.*, vol. 67, No. 18, pp. 3140–3147, (1995) [entire article].

"Preparation and Properties of Mixed–Valence ($\mu$–Dinitrogen)bis(pentaammine) Complexes of Osmium and Ruthenium", Richardson et al., *Inorg. Chem.*, vol. 21, pp. 3136–3140, (1982) [First Page with Abstract].

"Investigation of the Spectroscopic, Electrochemical, and Spectroelectrochemical Properties of Osmium(II) Complexes Incorporating Polyazine Bridging Ligands: Formation of the Os/Os and Os/Ru Mixed Valence Complexes" Richter, et al., *Inorg. Chem.*, vol. 32, pp. 2827–2834, (1993) [First Page with Abstract].

"Osmium(II)/Ruthenium(II) Trimetallics Incorporating Polyazine Bridging Ligands: Isolavent Near–IR Absorbers with Unique Electrochemical Behavior", Richter et al., *Inorg. Chem.*, vol. 32, pp. 5762–5768, (1993) [First Page with Abstract].

"Electrogenerated Chemiluminescence. 59. Rhenium Complexes", Richter et al., *Anal. Chem.*, vol. 68, pp. 4370–4376, (1996) [First Page].

Blackburn et al., "Electrochemiluminescence Detection for Development of Immunoassays and DNA Probe Assays for Clinical Diagnostics", *Clin. Chem.*, vol. 37, No. 9, pp. 1534–1539 (1991).

Casper et al., "Application of the Energy Gap Law to Nonradiative, Excited–State Decay", *J. Phys. Chem.*, vol. 87, No. 6, pp. 952–957 (1983).

Ege et al., "Electrogenerated Chemiluminescent Determination of $Ru(bpy)_3{}^{2+}$ at Low Levels", *Anal. Chem.*, vol. 56, pp. 2413–2417 (1984).

Knight et al., "Occurrence , Mechanisms and Analytical Applications of Electrogenerated Chemiluminescence", *Analyst*, vol. 119, pp. 879–890 (1994).

Leland et al., "Electrogenerated Chemiluminescence: An Oxidative–Reduction Type ECL Reaction Sequence Using Tripropyl Amine", *J Electrochem. Soc.*, vol. 137, No. 10, pp. 3127–3131 (1990).

Massey, "Electrochemiluminescence: A Novel Detection System for the Development of Immunoassays and DNA Probe Assays for Clinical Diagnostic and Research Applications", *Biomedical Products*, (Oct. 1992).

Moellering, "Meeting the Challenges of β–lactamases", *J. Antimicrobial, Chemotherapy*, vol. 31, Suppl. A, pp. 1–8 (1993).

Noffsinger et al. "Generation of Chemiluminescence upon Reaction of Aliphatic Amines with Tris(2,2'–bipyridine)ruthenium(III)", *Anal. Chem.*, vol. 59, No. 6, pp. 865–868 (1987).

Rubinstein, et al., "Electrogenerated Chemiluminescence 3. Systems Based on Ru(2.2'–bipyridine)$_3^{2+}$ and Oxalate or Organic Acids", *J. Am. Chem. Soc.*, vol. 103, pp. 512–516 (1981).

Rubinstein et al., "Electrogenerated Chemiluminescent Determination of Oxalate", *Anal. Chem.*, vol. 55, No. 9, pp. 1580–1582 (1983).

Wallace et al., "Electrogenerated Chemiluminescence XXXII. ECL from Energy–Deficient Aromatic Hydrocarbon Acceptor and Tetrathiafulvalene Donor Systems", *J. Phys. Chem.*, vol. 125, No. 9, pp. 1430–1435 (1979).

White et al., "Electrogenerated Chemiluminescence. 41. Electrogenerated Chemiluminescence and Chemiluminescence of the Ru(2,2'–bpy)$_3^{2+}$–S$_2$O$_8^{2-}$ System in Acetonitrile–Water Solutions", *J. Am. Chem. Soc.*, vol. 104, No. 25, pp. 6891–6895 (Dec. 15, 1982).

* cited by examiner bphb bbpe

ELECTROCHEMILUMINESCENT LABEL BASED ON MULTIMETALLIC ASSEMBLIES

This application claims the benefit of provisional application No. 60/051,341 filed Jun. 27, 1997.

BACKGROUND OF THE INVENTION

1. Field of the Invention

The present invention relates generally to the field of electrogenerated chemiluminescence (ECL). More particularly, it concerns a multimetallic assembly with ligands that bridge independent chromophores for use in ECL devices and ECL methods of improved sensitivity.

2. Description of Related Art

Electrogenerated chemiluminescence, alternatively referred to as electrochemiluminescence, involves the formation of excited state species as a result of highly energetic electron-transfer reactions of reactants formed electrochemically. ECL systems and devices that make use of molecules that luminesce upon electrical excitation have been widely studied and are used for such purposes as display devices and instruments for chemical analysis. Several reviews have appeared on both the theory and application of ECL (Faulkner and Bard, 1977; Faulkner and Glass, 1982; Yang et al., 1994; Knight and Greenway, 1994).

The first report of ECL in a metal chelate appeared in 1972, in which the excited state of $Ru(bpy)_3^{2+}$ was generated in nonaqueous media by electrochemical formation and subsequent annihilation of the reduced $Ru(bpy)_3^+$ and oxidized $Ru(bpy)_3^{3+}$ species (Tokel and Bard, 1972).

   (1)

   (2)

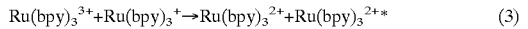   (3)

   (4)

The potential range (window of stability) in nonaqueous solvents (e.g., +2.5 to −2.5 V vs. NHE in MeCN) allows formation of the energetic precursors necessary in the annihilation sequence. However, given the limited potential window of water, alternative means must be used to produce the excited state (e.g., $Ru(bpy)_3^{2+*}$) for aqueous ECL. For example, in the presence of a luminophore such as $Ru(bpy)_3^{2+}$, oxidation of species like oxalate or tripropylamine (TPrA) or reduction of a species like peroxydisulfate ($S_2O_8^{2-}$) have been shown to generate the necessary energetic precursors for excited state formation (Yang et al., 1994; Knight and Greenway, 1994; Rubinstein and Bard, 1981; Rubinstein et al., 1983; Ege et al., 1984; White and Bard, 1982; McCord and Bard, 1991; Leland and Powell, 1990). The presumed mechanism involves formation of strong reductants ($CO_2^-$.or TPrA.) or strong oxidants ($SO_4^-$.) that can interact with $Ru(bpy)_3^{3+}$ or $Ru(bpy)_3^+$ respectively, to produce the excited state:

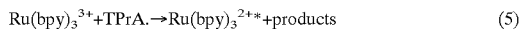   (5)

or

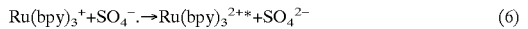   (6)

$Ru(bpy)_3^{2+}$ is used as an ECL-active label in DNA and immunoassay probes and for clinical analyses (U.S. Pat. Nos. 5,221,605; 5,238,808; 5,310,687; 5,453,356; 5,714,089; 5,731,147; Ege et al., 1984; Blackburn et al., 1991).

ECL has several advantages over other detection techniques like fluorescence because no excitation source is required, and thus, ECL is immune to interference from luminescent impurities and scattered light. However, as with fluorescence labeling techniques, the sensitivity of the analysis depends on the ECL efficiency of the label.

With the goal of increasing the magnitude of ECL emission, this earlier work was extended to the use of multimetallic systems. Several reports on ECL with multimetallic systems have appeared, including Mo and W clusters (Mussel and Nocera, 1990; Ouyang et al., 1986) and a bimetallic Pt complex, $Pt_2(\mu-P_2O_5H_2)_4^{4-}$ (Vogler and Kunkeley, 1984; Kim et al., 1985). However, the ECL efficiency (taken as the number of photons emitted per redox event) in these systems was much weaker than $Ru(bpy)_3^{2+}$ under the same experimental conditions. Moreover, these earlier studies precluded the use of water because of the insolubility and instability of these complexes in an aqueous environment (Mussel and Nocera, 1990: Ouyang et al., 1986; Vogler and Kunkeley, 1984; Kim et al., 1985).

There have been no reports of ECL in multimetallic ruthenium systems. Often, coordination of a second metal center through a bridging-ligand (BL) framework (e.g., $L_2M(BL)ML_2$) leads to decreased photoluminescence quantum efficiencies and excited-state lifetimes. For example, $Ru(bpy)_3^{2+}$ has an excited-state lifetime of emission (τem) of about 600 ns (Bock et al., 1974; Bock et al., 1979; Navon and Sutin, 1974; Sutin and Creutz, 1978; Meyer, 1978; Hage et al., 1990; Barigelletti et al., 1991; and references therein; Demas and Crosby, 1971) and an emission quantum efficiency (φem) in MeCN of 0.086 (Kawanishi et al., 1984). Replacement of one bipyridine with a ligand capable of bridging two independent metal centers such as 2,3-bis(2'-pyrifyl)pyrazine (dpp) results in a decrease of φem to 0.064 for $Ru(bpy)_2(dpp)^{2+}$ and τem~200 ns. [In Brauenstein et al., 1984, Brauenstein reported the relative quantum efficiencies of $Ru(bpy)_2(dpp)^{2+}$ and $[(bpy)_2Ru]_2(dpp)^{4+}$ compared to $Os(bpy)_3^{2+}$ (0.0348±0020) (Demas and Crosby, 1971). The values shown are scaled to $Ru(bpy)_3^{2+}$ (τem=0.086) (Kawanishi et al., 1984) to make comparisons more valid.] Addition of a second $Ru(bpy)_2^{2+}$ moiety to form $[(bpy)_2Ru]_2(dpp)^{4+}$ gives φem=0.0007 and τem<50 ns (Brauenstein et al., 1984). This appears to be the general behavior. Other studies on Ru(II) diimine systems have shown that the monometallic parent complex might be luminescent in fluid solution at room temperature, but the bimetallic system is usually not (Dose and Wilson, 1978; Hunziker and Ludi, 1977; Goldsby and Meyer, 1984; Richardson et al., 1982; Richter and Brewer, 1993). A number of these systems were prepared in mixed oxidation states (i.e., $L_2M^{III}(BL)M^{II}L_2$) with the goal of defining the intervalence charge-transfer transition that is often present in the mixed-valence state (Creutz and Taube, 1969; Creuiz and Taube, 1972; Elias and Drago, 1972; Callahan et al., 1974; Callahan et al., 1975; Tom and Taube, 1975; Krentzien and Taube, 1976; Powers et al., 1976). In such studies, luminescence is not necessary to probe the photophysical and charge-transfer behavior. However, luminescence is a necessary prerequisite for efficient ECL.

The emission displayed by $[(bpy)_2Ru]_2(dpp)^{4+}$ and its monometallic analogue in fluid solution at room temperature has been traced to the weak metal-metal interaction present in the bimetallic system and the bipyridine-like environment conferred by the bridging dpp ligand (Brauenstein et al., 1984). However, even in this case, luminescence in the bimetallic system is much weaker than that observed in the parent compound. Many photophysical studies on ruthenium and osmium multimetallic complexes have centered on systems where the degree of electronic coupling between metal centers, as mediated by the BL-based orbitals, varies over orders of magnitude (i.e., Robin and Day Class II and III systems) (Dose and Wilson, 1978; Hunziker and Ludi, 1977; Goldsby and Meyer, 1984; Richardson et al., 1982; Richter and Brewer, 1993; Creutz and Taube, 1969; Creutz and Taube, 1972; Elias and Drago, 1972; Callahan et al., 1974; Callahan et al., 1975; Tom and Taube, 1975; Krentzien and Taube, 1976; Powers et al., 1976; Robin and Day, 1967; Creutz, 1983). In such systems, increased electronic coupling between metal centers is directly influenced by the energy and density of states of the BL. Increasing electronic density on the lowest-unoccupied $\pi^*$ molecular orbitals and the acceptor orbitals active in the metal-to-ligand charge transfer (MLCT) transitions that produce the excited state leads to enhanced communication. However, such systems rarely display high photoluminescence efficiencies. In fact, these systems rarely display any photoluminescence in fluid solution (Dose and Wilson, 1978; Hunziker and Ludi, 1977; Goldsby and Meyer, 1984; Richardson et al., 1982; Richter and Brewer, 1993). Despite the wealth of data on systems with significant interaction between metal centers, much less has been done on those where there is very weak coupling so that the metal centers are isolated or valence trapped (Robin and Day Class I systems) (Robin and Day, 1967; Creutz, 1983).

In recent reports on bimetallic ruthenium systems with small electronic coupling between metal centers (Baba et al., 1995; Boyde et al., 1990; Liang et al., 1996), excited-state lifetimes that were greater than those for monometallic derivatives were reported. For example, $[(dmb)_2Ru]_2(bbpe)^{4+}$ (Boyde et al., 1990) and $[(dmb_2Ru]_2(bphb)^{4+}$ (Baba et al., 1995) [dmb =4,4'-dimethyl-2,2'-bipyridine, bbpe=trans-1,2-bis(4'-methyl-2,2'-bipyridyl-4-yl)ethene, and bphb=1,4-bis(p'-methyl-2,2'-bipyridin-4-yl)benzene] have τem=1.31 and 1.57 µs, respectively, compared to 0.95 µs for the tris-substituted $Ru(dmb)_3{}^{2+}$ system. The monometallic species $(dmb)_2Ru(bphb)^{2+}$ yielded τem=1.34 µs and φem=0.109; while the φem for $[(dmb)_2Ru]_2(bphb)^{4+}$ was 0.125. Thus, in contrast to previously studied systems, these bimetallic complexes clearly show increased efficiencies and lifetimes over the monometallic ones. This has been attributed to a larger Ru(dπ)→bphb(π*) transition dipole and a smaller electron-vibrational coupling constant, resulting in a smaller degree of excited state distortion (Baba et al., 1995; Boyde et al., 1990).

SUMMARY OF THE INVENTION

Provided herein is an efficient multimetallic ECL compound. The present invention is based upon a bimetallic ruthenium species wherein the ruthenium chromophores are electronically and spatially isolated via a bridging, chelating ligand. The compound is soluble in aqueous media and emits under similar conditions as $Ru(bpy)_3{}^{2+}$ but with 2–3 times the magnitude of emission. The availability of labels with much higher luminescence sensitivity, as described herein, provides a marked improvement over currently available ECL labels by extending the useful range of ECL in analytical applications, particularly in DNA probe technology, where detection of biomolecules without resorting to amplification (e.g., PCR™ amplification) is highly advantageous.

As used herein, the multimetallic compounds for use in ECL systems include at least two metal ions, preferably ruthenium or osmium, with ruthenium being the most preferred. The invention may also include chemical moieties having more than two metal centers. Each metal ion is surrounded with ligands such that the total number of bonds between the ligands and the metal ion equals the coordination number of the metal ion. The ligands may all be the same or each metal may be bonded to a number of different ligands. At least one of the ligands is a bridging ligand, having bonds to at least two of the metal ions.

Bridging ligands may include, but are not limited to, dpp, bbpe, and bphb, with bphb being the most preferred bridging ligand. Non-bridging ligands may include both monodentate and polydentate ligands. The ligands may be substituted with groups, including carboxylate esters, that may be used to conjugate the ECL compound to other molecules, such as antibodies, cells, polypeptides, nucleic acids, polysaccharides, steroids, alkaloids, non-biological polymers and the like for use in chemical and biochemical analysis. Ligands may also be substituted with hydrophilic or hydrophobic groups to modulate their solubility properties. The most preferred non-bridging ligands of the invention are substituted and unsubstituted 2,2'-bipyridine (bpy) groups. The most preferred compound of the invention is $[(bpy)_2Ru]_2(bphb)^{4+}$.

In preferred embodiments of this invention, multimetallic ECL compounds are used in ECL cells and display devices. Because of their high ECL efficiencies, multimetallic systems of this type are particularly useful in the design of new labels for bioanalytical applications. Thus, in other preferred embodiments of the invention, the multimetallic ECL compounds are used as labels in systems for immunochemical analysis, DNA probes and in the detection of other biochemical and chemical compounds. The compounds may also be used in systems involving magnetic bead technology.

In one embodiment, the present invention is a chemical moiety, and a method of determining the presence of a chemical moiety, the method including (a) forming a reagent mixture containing the chemical moiety, or the chemical moiety and an agent which upon exposure of the reagent mixture to electrochemical energy forms either a reductant or an oxidant, the chemical moiety having the formula

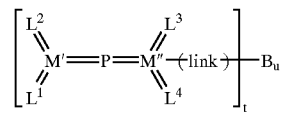

wherein M' and M" are independently selected from the group consisting of ruthenium and osmium; $L^1$, $L^2$, $L^3$, and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of the substituted ligands is substituted by an alkyl, aryl, aralkyl, carboxylate, carboxaldehyde, carboxamide, cyano, amino, hydroxycarbonyl, hydroxyamino, aminocarbonyl, arnidine, guanidinium, ureide, sulfur-containing group, phosphorus-containing group, or the carboxylate ester of N-hydroxysuccinimide, each of the ligands being the same or not the same as each other ligand; P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane; B is a biological substance, a synthetic substance which is capable of competing with a biological substance in a competitive binding reaction with a complementary material, or a non-biological polymer; t is an integer equal to or greater than 1; u is an integer equal to or greater than 1; the link being covalent bonding linking B with at least one of $L^1$, $L^2$, $L^3$, and $L^4$; $L^1$, $L^2$, $L^3$, $L^4$, P and B being of such composition and number that the chemical moiety is capable of being induced to electrochemiluminesce; (b) exposing the reagent mixture to electrochemical energy the potential of which oscillates between a potential sufficiently positive to oxidize the chemical moiety and a potential sufficiently negative to reduce the chemical moiety, or to electrochemical energy such that the chemical moiety is oxidized and the agent forms a reductant, or such that the chemical moiety is reduced and the agent forms an oxidant, thereby to induce the chemical moiety to electrochemiluminesce; and (c) detecting emitted luminescence thereby to determine the presence of the chemical moiety.

In certain aspects, the link is one or more amide linkages, ester or thioester linkages, or ether or thioether linkages, each of which linkages covalently bonds B with one of $L^1$, $L^2$, $L^3$, and $L^4$. In other aspects, B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer. In certain specific aspects, B is a serum-derived antibody or a monoclonal antibody, a nucleotide or polynucleotide, or a T4 thyroid hormone.

Other embodiments of the present invention include a method of determining the presence of an analyte of interest which binds to a chemical moiety, the moiety having a having a formula as described hereinabove, and the method including the steps of (a) forming a reagent mixture including the chemical moiety, or including the chemical moiety and an agent which upon exposure of the reagent mixture to electrochemical energy forms either a reductant or an oxidant, and the analyte of interest; such that the chemical moiety and the analyte specifically bind to one another; (b)exposing the reagent mixture to electrochemical energy the potential of which oscillates between a potential sufficiently positive to oxidize the chemical moiety and a potential sufficiently negative to reduce the chemical moiety, or to electrochemical energy such that the chemical moiety is oxidized and the agent forms a reductant, or such that the chemical moiety is reduced and the agent forms an oxidant, thereby to induce the chemical moiety to electrochemiluminesce; and (c) detecting emitting luminescence thereby to determine the presence of the analyte of interest.

In certain aspects of the invention, the analyte is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer. In certain specific aspects, the analyte is insulin, digoxin, digitoxin, T4 thyroid hormone, a fungus, an antibody, a pharmacological agent, or sugar.

In yet other embodiments, the invention includes a competitive binding method of determining the presence of an analyte of interest wherein the analyte and a chemical moiety bind competitively to a complementary material, the method including (a) forming a reagent mixture including the analyte of interest, the complementary material and the chemical moiety, or the chemical moiety and an agent which upon exposure of the reagent mixture to electrochemical energy forms either a reductant or an oxidant, such that the chemical moiety and the analyte of interest bind competitively to the complementary material; (b) exposing the reagent mixture to electrochemical energy the potential of which oscillates between a potential sufficiently positive to oxidize the chemical moiety and a potential sufficiently negative to reduce the chemical moiety, or to electrochemical energy such that the chemical moiety is oxidized and the agent forms a reductant, or such that the chemical moiety is reduced and the agent forms an oxidant, thereby to induce the chemical moiety to electrochemiluminesce; and (c) detecting emitted luminescence thereby to determine the presence of the analyte of interest.

In additional embodiments, the present invention includes a system for determining the presence of a chemical moiety, the system including (a) a reagent mixture including the chemical moiety, or the chemical moiety and an agent which upon exposure of the reagent mixture to electrochemical energy forms either a reductant or an oxidant; (b) means for exposing the reagent mixture to electrochemical energy the potential of which oscillates between a potential sufficiently positive to oxidize the chemical moiety and a potential sufficiently negative to reduce the chemical moiety, or to electrochemical energy such that the chemical moiety is oxidized and the agent forms a reductant, or such that the chemical moiety is reduced and the agent forms an oxidant, thereby to induce the chemical moiety to electrochemiluminesce; and (c) means for detecting emitted luminescence thereby to determine the presence of the chemical moiety.

In another embodiment, the invention includes a system for determining the presence of an analyte of interest which binds to a chemical moiety, the system including (a) a reagent mixture including the chemical moiety, or including the chemical moiety and an agent which upon exposure of the reagent mixture to electrochemical energy forms either a reductant or an oxidant, and the analyte of interest; (b)means for contacting the chemical moiety with the analyte of interest to form a reagent mixture; (c) means for exposing the reagent mixture to electrochemical energy the potential of which oscillates between a potential sufficiently positive to oxidize the chemical moiety and a potential sufficiently negative to reduce the chemical moiety, or to electrochemical energy such that the chemical moiety is oxidized and the agent forms a reductant, or such that the chemical moiety is reduced and the agent forms an oxidant, thereby to induce the chemical moiety to electrochemiluminesce; and (d) means for detecting emitted luminescence thereby to determine the presence of the chemical moiety.

In one embodiment, the present invention includes a chemical moiety and a method of determining the presence of the chemical moiety having the formula:

$$[(L^1)_n(L^2)_o(L^3)_p(L^4)_q(L^5)_r(L^6)_sM'(P)M''(L^7)_v(L^8)_w(L^9)_x(L^{10})_y(L^{11})_z(L^{12})_k]_t(B)_u$$

wherein M' and M'' are independently selected from ruthenium and osmium; $L^1$, $L^2$, $L^3$, $L^4$, $L^5$, and $L^6$ are ligands of M', each of which may be the same as or not the same as each other ligand; $L^7$, $L^8$, $L^9$, $L^{10}$, $L^{11}$, and $L^{12}$ are ligands of M'', each of which may be the same as or not the same as each other ligand; P is a bridging ligand selected from the group consisting of dpp, bbpe, bphb, α,ω-(2,2'-bipyrid-4-yl)-alkanes), 4,4'-bipyridines, and 1,2-bis (diphenylphosphine)ethane; B is a substance which is attached to one or more of $L^1$, $L^2$, $L^3$, $L^4$, $L^5$, $L^6$, $L^7$, $L^8$, $L^9$, $L^{10}$, $L^{11}$, and $L^{12}$; each of n, o, p, q, r, s, v, w, x, y, z, and k is zero or an integer; t is an integer equal to or greater than 1; u is an integer equal to or greater than 1; $L^1$, $L^2$, $L^3$, $L^4$, $L^5$, $L^6$, $L^7$, $L^8$, $L^9$, $L^{10}$, $L^{11}$, $L^{12}$, P and B being of such composition and number that the chemical moiety can be induced to electrochemiluminesce and the total number of bonds to M' provided by the ligands of M' equals the coordination number of M', and ; and the total number of bonds to M'' provided by the ligands of M'' equals the coordination number of M'; the method including (a) forming a reagent mixture under suitable conditions containing the chemical moiety; (b) inducing the chemical moiety to electrochemiluminesce by exposing the reagent mixture to electrochemical energy; and (c) detecting emitted luminescence and thereby determining the presence of the chemical moiety. In certain aspects, the invention B may be a substance covalently bound to one or more of $L^1, L^2, L^3, L^4, L^5, L^6, L^7, L^8, L^9, L^{10}, L^{11},$ or $L^{12}$ through one or more amide linkages.

In other embodiments, the invention includes a method of determining the presence of an analyte of interest which binds to a chemical moiety, the chemical moiety having the formula:

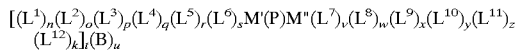

the method including (a) contacting the analyte with the chemical moiety under suitable conditions so as to form a reagent mixture such that the B substance of the chemical moiety and the analyte are capable of binding with one another; (b) inducing the chemical moiety to electrochemiluminesce by exposing the reagent mixture to electrochemical energy; and (c) detecting emitted luminescence and thereby determining the presence of the analyte of interest.

In yet other embodiments, the invention includes a competitive binding method of determining the presence of an analyte of interest wherein the analyte and a chemical moiety bind competitively to a chemical material, the chemical moiety having the formula:

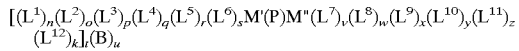

the method including: (a) binding the material, the B substance of the chemical moiety and the analyte under suitable conditions such that the chemical moiety and the analyte are capable of competitively binding with the material so as to form a reagent mixture containing the chemical moiety; (b) inducing the chemical moiety to electrochemiluminesce by exposing the reagent mixture to electrochemical energy; and (c) detecting emitted luminescence and thereby determining the analyte of interest.

In certain aspects, B is the same substance as the analyte. In certain other aspects, the material is a whole cell, subcellular particle, nucleic acid, polysaccharide, protein, lipoprotein, lipopolysaccharide, glycoprotein, polypeptide, cellular metabolite, hormone, tranquilizer, barbiturate, alkaloid, steroid, vitamin, or amino acid. In specific aspects, the chemical material is a serum-derived antibody or a monoclonal antibody, a DNA or RNA fragment, a pharmacological agent or sugar. The method may be a competitive binding method wherein the material is fixed to an insoluble matrix. In one aspect, the invention includes a method further defined as a heterogeneous method wherein the material is a monoclonal antibody and the insoluble matrix is the surface of an assay vessel. In another aspect, the invention includes a homogeneous method wherein the material is a monoclonal antibody and the insoluble matrix is the surface of an assay vessel.

In another embodiment, the invention includes a system for determining the presence of a chemical moiety having the formula:

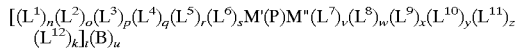

the system including (a) a reagent mixture including the chemical moiety; (b) means for inducing the chemical moiety to electrochemiluminesce; and (c) means for detecting emitted luminescence. In certain aspects of the system, the reagent mixture also includes one or more different chemical moieties each of which can be induced to luminesce at a different wavelength. In certain other aspects of the system, the reagent mixture also includes one or more different chemical moieties each of which can be induced to luminesce by exposure to energy of a different value or from a different source.

In yet another embodiment, the invention includes a system for determining the presence of an analyte of interest which binds to a chemical moiety, the moiety having the structural formula:

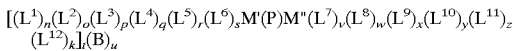

the system including (a) the chemical moiety; (b) a means for contacting the chemical moiety with the analyte of interest to form a reagent mixture such that the B substance of the chemical moiety and the analyte are capable of binding with one another; c) a means for inducing the chemical moiety to electrochemiluminesce; and d) a means for detecting emitted luminescence. In certain aspects of the system, the reagent mixture includes one or more different chemical moieties each of which can be induced to luminesce at a different wavelength, each moiety being attached to a different analyte of interest. In certain other aspects of the system, the reagent mixture includes one or more different chemical moieties each of which can be induced to luminesce by exposure to energy of a different value or from a different source, each moiety being bound to a different analyte of interest.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
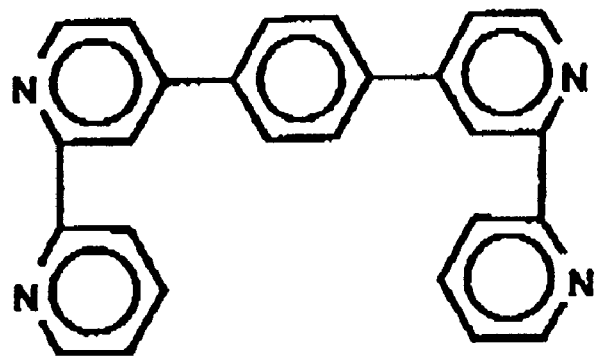
FIG. 1. Structures of ligands: 1,4-bis(4'-methyl-2,2'-bipyridin-4-yl)benzene (bphb) and trans-1,2-bis(4'-methyl-2,2'-bipyridyl-4-yl)ethene (bbpe).
Figure 1:
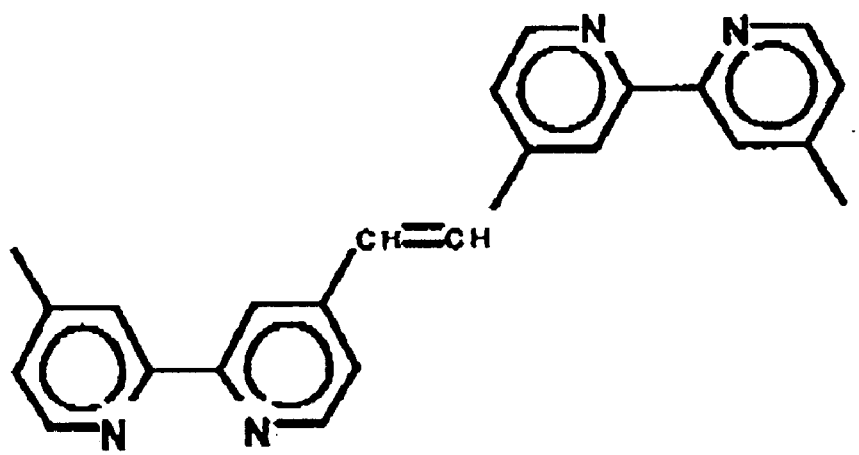

The present invention is based on the inventors' finding that ECL occurs in the bimetallic system $[(bpy)_2Ru]_2(bphb)^{4+}$ and its monometallic parent $(bpy)_2Ru(bphb)^{2+}$ in MeCN and MeCN:$H_2O$ via annihilation and with oxidative-reductive (TPrA) and reductive-oxidative ($S_2O_8^{2-}$) coreactants. The ECL emission with $[(bpy)_2Ru]_2(bphb)^{4+}$ in aqueous solution with the coreactant TPrA is twice that of $Ru(bpy)_3^{2+}$ at the same concentration. Even larger sensitivity improvements may be obtainable by linking additional $Ru(II)(bpy)_2$ units together via links where the centers do not interact. The structure of the bphb bridging ligand as well as that of another possible bridging ligand, bbpe, are shown in FIG. 1.

Coordination of $(bpy)_2Ru^{2+}$ onto $(bpy)_2Ru(bphb)^{2+}$ leads to relative ECL efficiencies compared with $Ru(bpy)_3^{2+}$ close to those predicted from the photoluminescence efficiencies, indicating that formation of the lowest energy state responsible for luminescence, $^3MLCT$, is close to unity. The intense emission observed in nonaqueous and partially aqueous solutions suggest that these types of multimetallic complexes might also be useful in ECL devices. The ECL mechanism involves several possible reaction pathways, including annihilation and reaction with strong oxidants and strong reductants formed directly at the electrode or by homogenous electron-transfer reactions in solution.

Figure 2A:
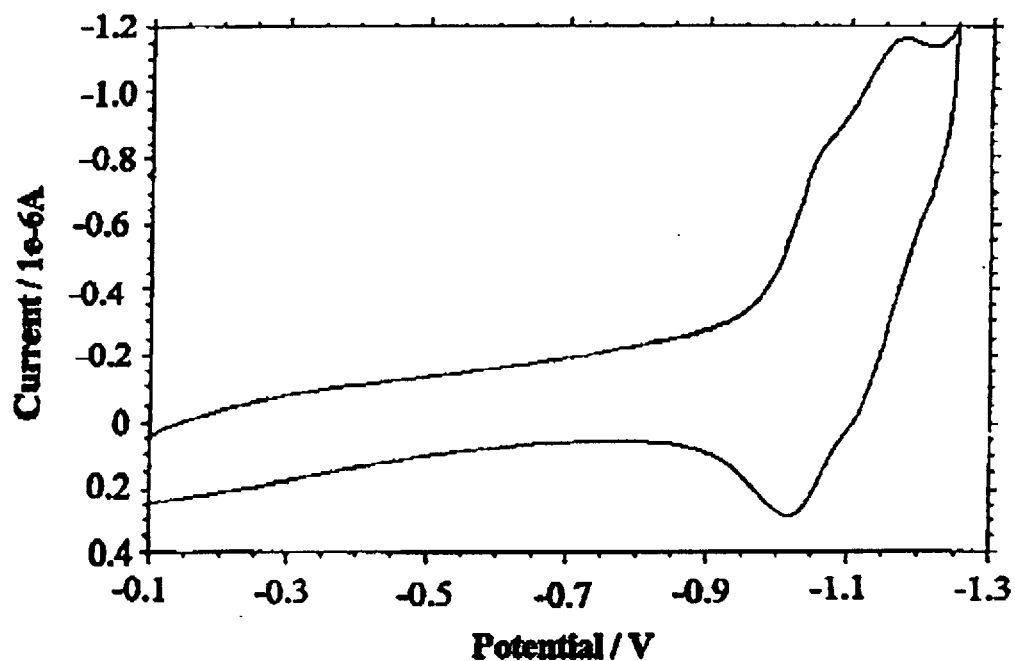
FIG. 2. Reductive cyclic (FIG. 2A) and square-wave (FIG. 2B) voltammograms of 1 mM [(bpy)$_2$Ru]$_2$(bphb)(PF$_6$)$_4$ in MeCN/0.1 M Bu$_4$NPF$_6$. Scan rate=100 mV/s.
Figure 2B:
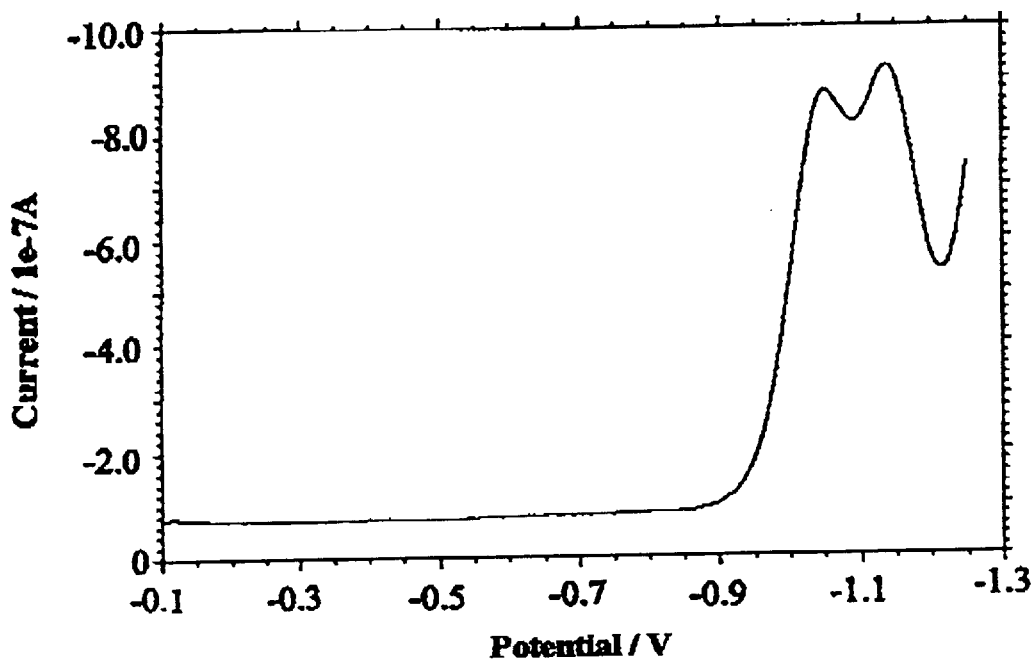
Figure 3A:
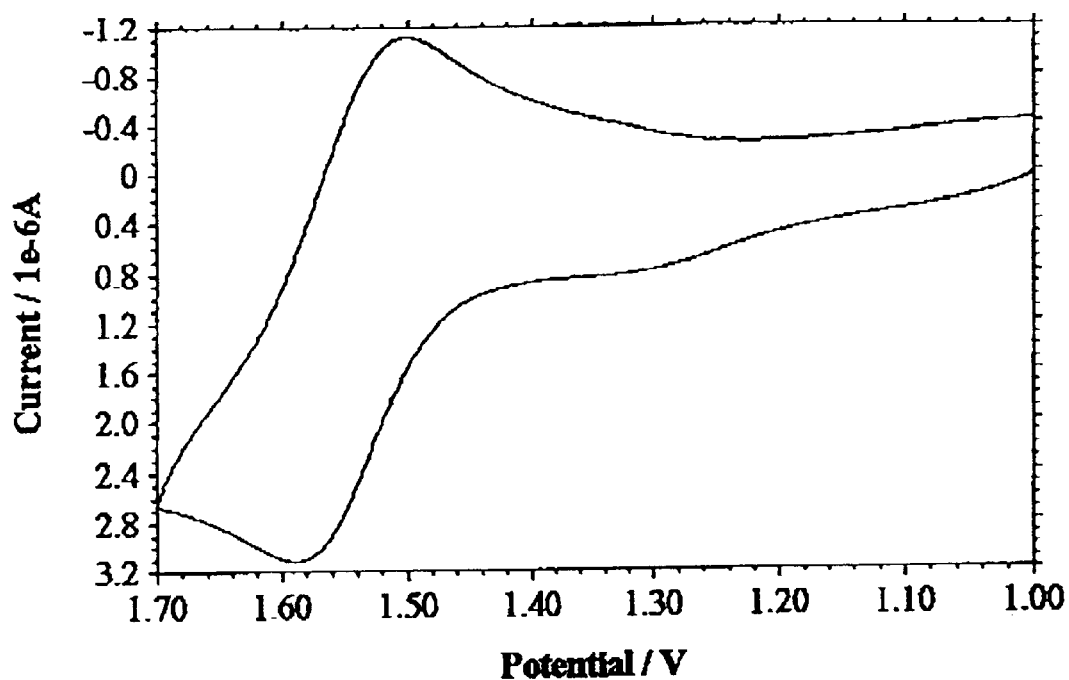
FIG. 3. Oxidative cyclic (FIG. 3A) and square-wave (FIG. 3B) voltammograms of [(bpy)$_2$Ru]$_2$(bphb)(PF$_6$)$_4$. Same conditions as in FIG. 2.
Figure 3B:
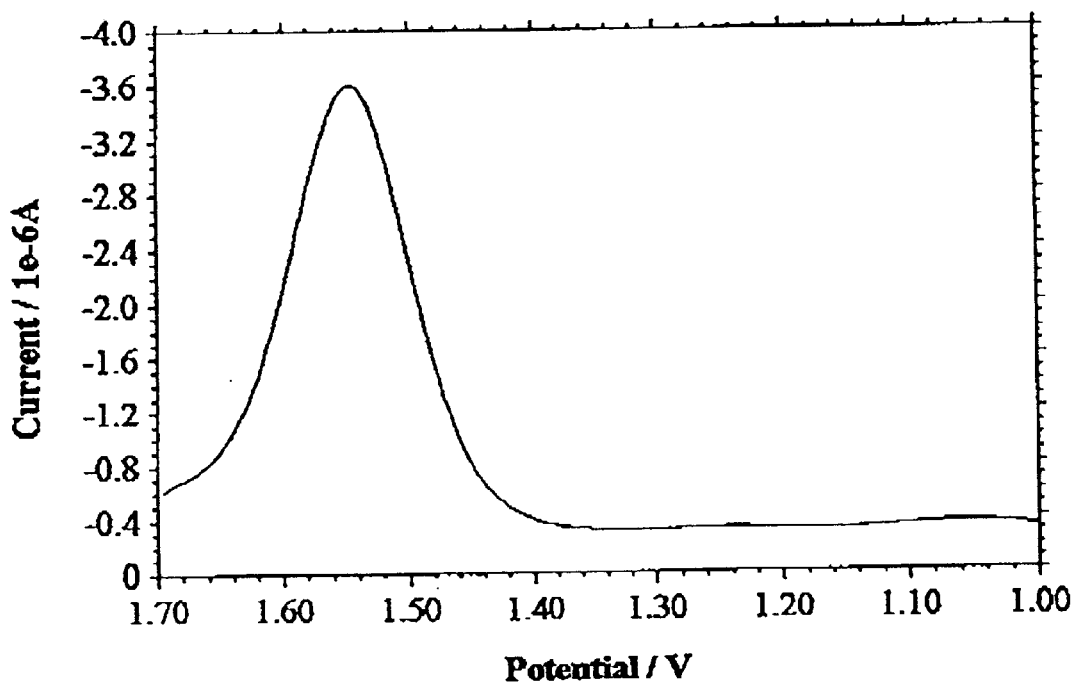

Reductive and oxidative cyclic voltammograms of $[(bpy)_2Ru]_2(bphb)^{4+}$ are shown in FIG. 2A and FIG. 3A, respectively. Reductive and oxidative square-wave voltammograms are shown in FIG. 2B and FIG. 3B. The half-wave potentials ($E_{1/2}$) for oxidation and reduction of $[(bpy)_2Ru]_2(bphb)^{4+}$ are summarized in Table 1, in Example 1 below. Its first two one-electron reduction waves, separated by 150 mV (Liang et al., 1996), are ligand-based with the first assigned to the electron localized on the BL (Baba et al., 1995; Liang et al., 1996). The identity of the second wave is less clear, but by analogy to other Ru-based homo-bimetallics (Brauenstein et al., 1984; Boyde et al., 1990; Berger, 1990), this reduction is probably also BL in nature.

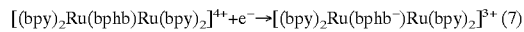

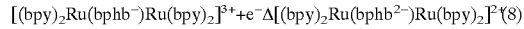

At more negative potentials a single, unresolved, two-electron wave appears (~-1.8 V) which, at a Pt electrode, displays a wave shape somewhat characteristic of an adsorptive process (Bard and Faulkner, 1980) with formation of neutral species. This suggests a two-electron reduction centered on the bpy ligands.

Figure 4:
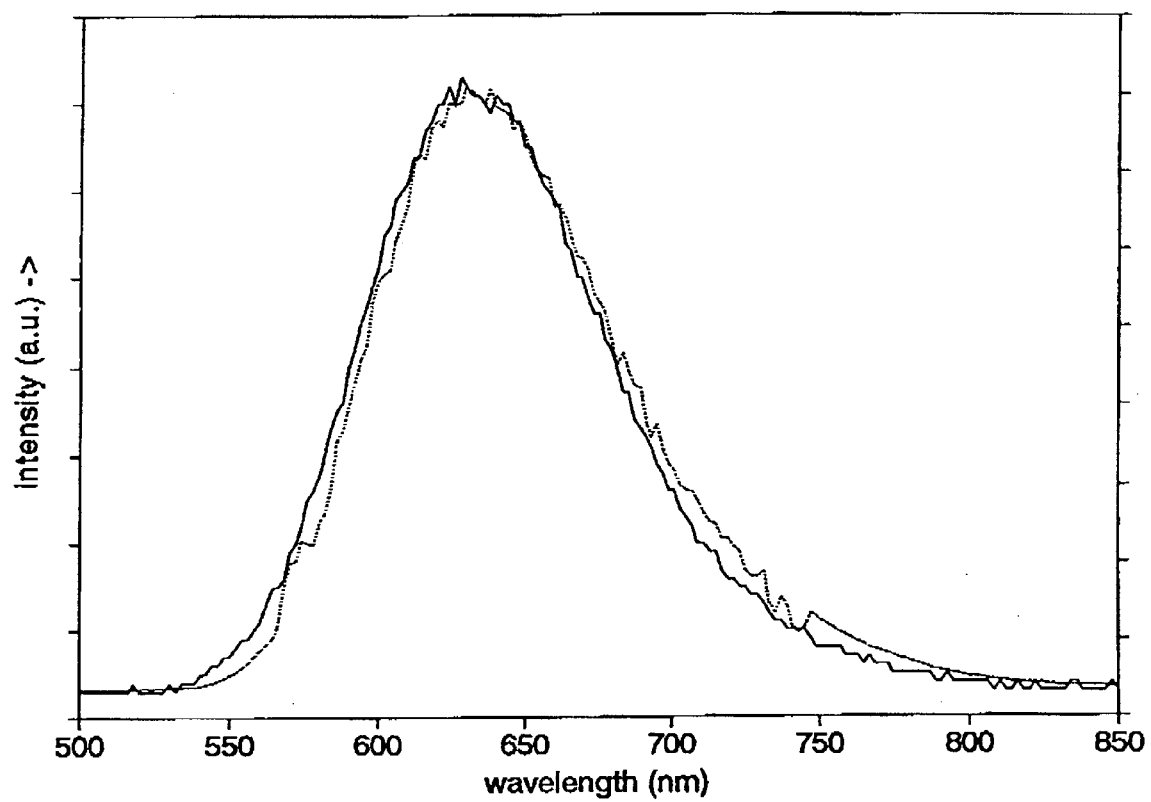
FIG. 4. ECL emission spectra of 1 mM [(bpy)$_2$Ru]$_2$(bphb)(PF$_6$)$_4$ generated via annihilation (- - -) and in the presence of TPrA (–). MeCN solutions were 1 $\mu$M in complex, 0.1 M in TPrA, and 0.1 M in Bu$_4$NPF$_6$, where appropriate. The annihilation spectrum was generated by alternate pulsing of the Pt electrode potential between +1.64 and −1.10 V. The TPrA spectrum was generate by pulsing of electrode potentials between 0 and +1.65 V via an oxidative-reductive coreactant sequence. Pulse length, 0.1 s. Annihilation spectrum (- - -) offset 5 nm to the red for clarity.

A single, unresolved, chemically reversible two-electron wave appears at +1.57 V for the Ru(II/III) couples (FIG. 3B) (Baba et al., 1995; Liang et al., 1996). The absence of discrete oxidation waves, even in square-wave voltammetry, indicates that electronic coupling between the metal centers is small (Baba et al., 1995; Boyde et al., 1990), showing a system containing multiple non-interacting redox centers (Flanagan et al., 1978). ECL was obtained during annihilation by first stepping to a potential corresponding to $E_{pc}$, the potential for the first BL-based reduction, and then to an $E_{pa}$ corresponding to the formation of the Ru (II/III) couples. The ECL emission spectrum shown in FIG. 4 is identical to that obtained with photoexcitation, indicating population of the same emitting ($^3MLCT$) states by the redox process as are formed photochemically. The ECL emission is clearly visible to the non-dark adapted eye at millimolar concentrations, qualitatively indicating highly efficient ECL. For a more quantitative measure of relative efficiency, the area under the emission curve was integrated and compared to that of $Ru(bpy)_3^{2+}$ ($\phi_{ECL}$~0.05) (Itoh and Honda, 1979; Wallace and Bard, 1979) under identical experimental conditions (McCord and Bard, 1991; Laser and Bard, 1975; Bezman and Faulkner, 1972). These results are shown in Table 2 in Example 1 below. The ECL quantum efficiency is defined as the number of photons emitted compared to the amount of reactant generated during a pulse (calculated from the integrated current) (McCord and Bard, 1991; Wallace and Bard, 1979). In the bimetallic complex incorporating bphb, $\phi_{ECL}$=0.16±0.03 is obtained for the annihilation in ECL, a value close to that predicted from the photoluminescence efficiencies in Table 2. This indicates that with $[(bpy)_2Ru]_2(bphb)^{4+}$, as with $Ru(bpy)_3^{2+}$ and related systems (McCord and Bard, 1991; Laser and Bard, 1975; Bezman and Faulkner, 1972) the overall yield of excited states formed during the annihilation reaction is close to unity.

Very intense ECL also results from the oxidation of MeCN and partially aqueous (50:50 (v/v) MeCN:$H_2O$) solutions containing $[(bpy)_2Ru]_2(bphb)^{4+}$ and TPrA (FIG. 4) or reduction of mixtures of $[(bpy)_2Ru]_2(bphb)^{4+}$ and $S_2O_8^{2-}$. ECL was not observed under these conditions in solutions containing only $[(bpy)_2Ru]_2(bphb)^{4+}$ or only coreactant. Relative efficiencies, $\phi r$ are shown in Table 2. In studies containing coreactants, the absolute ECL quantum efficiencies for the reference systems (i.e., $Ru(bpy)_3^{2+}$/TPrA and $Ru(bpy)_3^{2+}$/$S_2O_8^{2-}$) are unknown, thus relative efficiencies are reported taking that of $Ru(bpy)_3^{2+}$ as 1. In the $[(bpy)_2Ru]_2(bphb)^{4+}$/TPrA systems, the relative integrated ECL intensity is 2.5 to 3 times that of the corresponding $Ru(bpy)_3^{2+}$/TPrA reference, i.e., about the same ratio as that observed in the $[(bpy)_2Ru]_2(bphb)^{4+}$ annihilation system. A partially aqueous environment did not perturb (i.e., decrease) the ECL intensity.

For the $[(bpy)_2Ru]_2(bphb)^{4+}/S_2O_8^{2-}$ systems, $\phi_{ECL}$ was only 0.6–0.8 times that of the $Ru(bpy)_3^{2+}/S_2O_8^{2-}$ reference system, much less than that observed in the corresponding annihilation of TPrA sequences. The reasons for this are unclear. The MLCT states and hence luminescence in Ru(diimine) systems are sensitive to the nature of the coordination environment and the solvation shell (Bock et al., 1974; Bock et al., 1979; Navon and Sutin, 1974; Sutin and Creutz, 1978; Meyer, 1978; Hage et al., 1990; Barigelletti et al., 1991; and references therein). ECL also depends on a number of factors, including electrolyte composition and concentration (Maness et al., 1994), and the manner in which ECL is generated (Richter et al., 1996). As with the $[(bpy)_2Ru]_2(bphb)^{4+}$/TPrA system, $\phi_{ECL}$ does not appear to be greatly affected in a partially aqueous media.

Studies were also performed in aqueous solutions of $[(bpy)_2Ru]_2(bphb)^{4+}$ and TPrA. The relative efficiencies were obtained by normalizing the relative intensities to concentration and are reported in Table 2. The value in the table is the average of at least six independent trials. While efficiencies in partially aqueous solution (50:50 (v/v) MeCN:$H_2O$) are comparable to those in MeCN, the efficiency is slightly lower in a purely aqueous environment ($\phi_r$, ECL=2). The analyzer used for the aqueous studies employs a flow injection cell for rapid and reproducible determinations of sequential samples (Leland and Powell, 1990). Loss of luminophore by adsorption on the walls of both the tubing and cell can occur with polyaromatic hydrocarbons (Richards and Bard, 1995), $Ru(bpy)_3^{2+}$ and related compounds (McCord and Bard, 1991). Another possibility for loss in efficiency lies with the design of the electrochemical cell used in the Origen I analyzer. In the Origen I system (Leland and Powell, 1990), the working and counter electrodes are in close proximity to one another, with the reference located downstream. This design results in a large iR drop across the cell, leading to uncertainty in the potential applied during the oxidative pulse sequence. If the potential is greater than that necessary to oxidize the metal centers, other processes (e.g., oxidation of solvent) can compete with the electron-transfer reactions necessary for ECL to occur. Despite the lower luminescence that occurs in an aqueous phosphate buffer medium, the factor of 2 increase over Ru(bpy)$_3^{2+}$ makes this system attractive as a label in aqueous ECL analyses.

Figure 5:
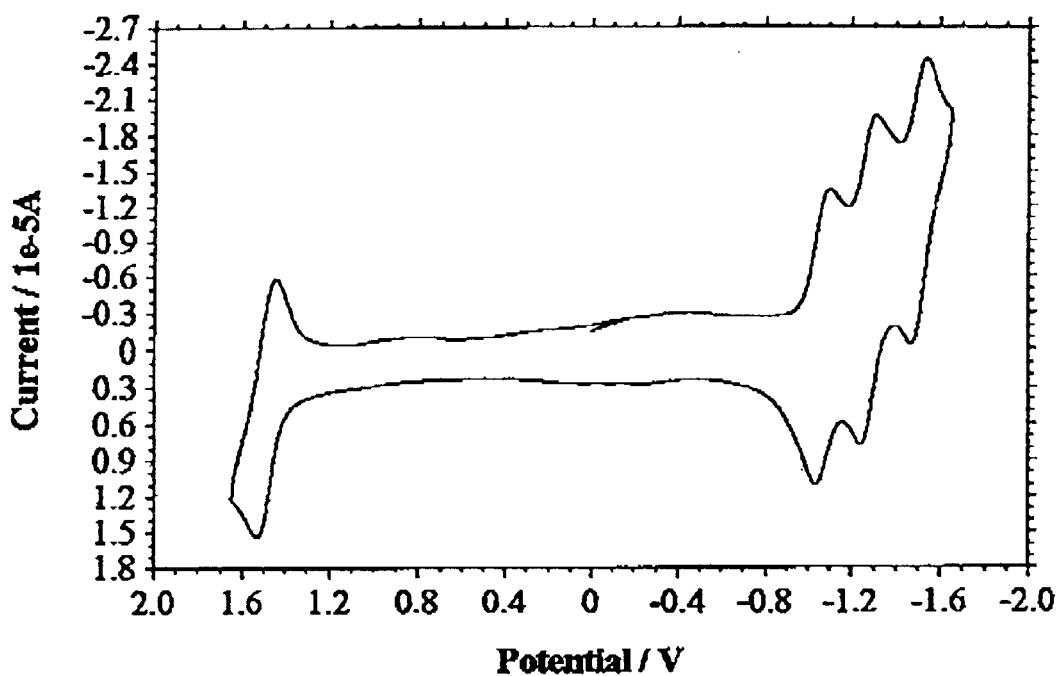
FIG. 5. Cyclic voltammogram of (bpy)$_2$Ru(bphb)(PF$_6$)$_2$. Same conditions as in FIG. 2.

Potentials for oxidation and reduction of (bpy)$_2$Ru(bphb)$^{2+}$ are also listed in Table 1. The cyclic voltammogram in MeCN shown in FIG. 5 is almost identical in appearance to that of Ru(bpy)$_3^{2+}$. All waves represent one-electron transfers, with the first reduction being BL in nature followed by sequential bpy-based reductions (Baba et al., 1995).

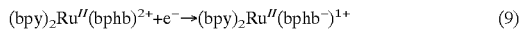
(9)

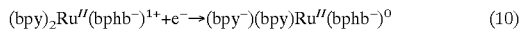
(10)

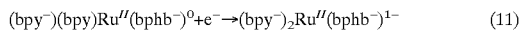
(11)

The lone oxidation has been assigned to the Ru(II/III) couple by comparison to (dmb)$_2$Ru(bphb)$^{2+}$ (Baba et al., 1995).

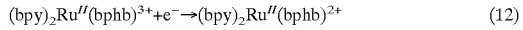
(12)

Figure 6:
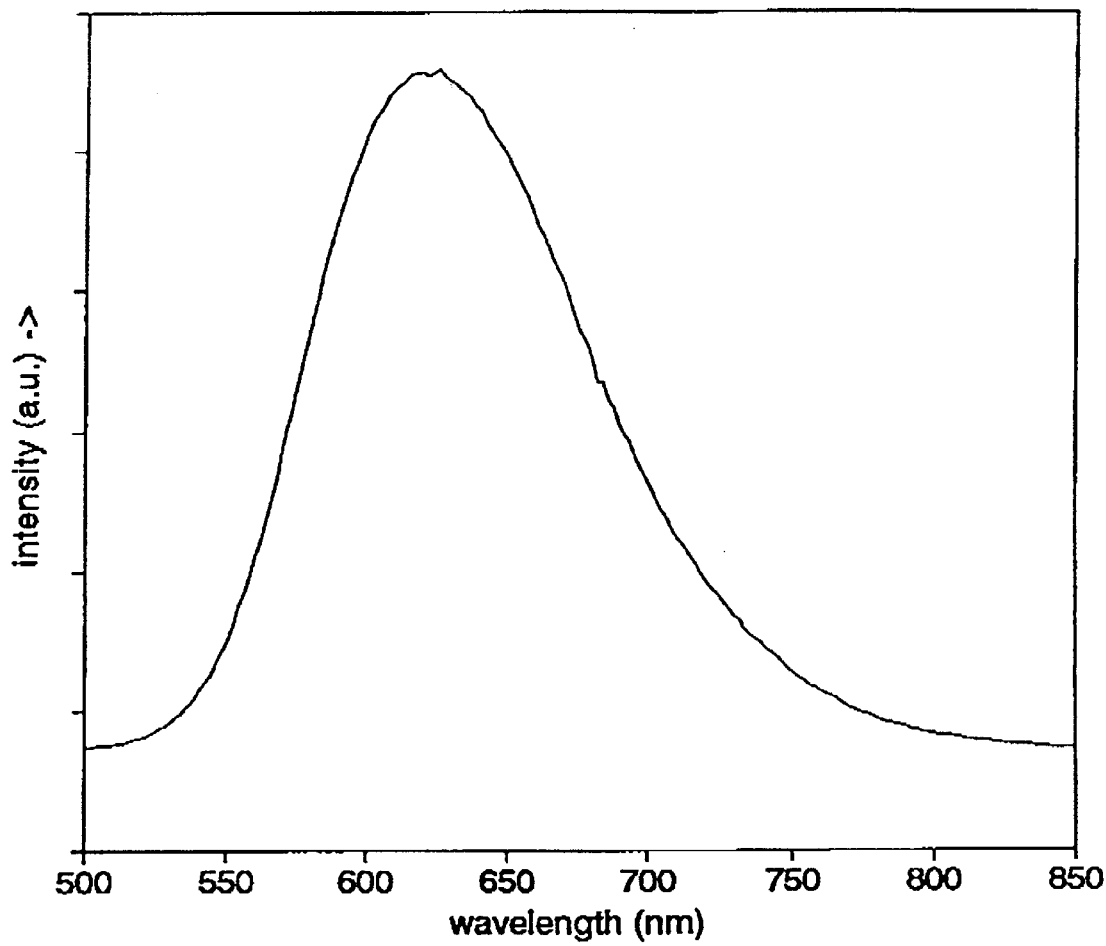
FIG. 6. ECL emission spectrum of (bpy)$_2$Ru(bphb)$^{2+}$ with (Bu$_4$N)S$_2$O$_8$. MeCN solutions were 1 mM in complex, 10 mM in (Bu$_4$N)S$_2$O$_8$, and 0.1 M in Bu$_4$NPF$_6$. The S$_2$O$_8$$^{2-}$ spectra were generated by pulsing of the electrode potential between 0 and −1.1 V. Holding time at each limit was 0.1 s.

Bright orange ECL was obtained at the surface of the working electrode, as with the bimetallic system, utilizing both annihilation and coreactant methodology (FIG. 6). Relative ECL efficiencies for the different pathways and in different solvent systems are reported in Table 2. (bpy)$_2$Ru(bphb)$^{2+}$ has a photoluminescence efficiency of 0.11 compared to Ru(bpy)$_3^{2+}$ (0.086) (Baba et al., 1995; Kawanishi et al., 1984). This compares quite well with the values obtained utilizing TPrA as a coreactant ($\phi_{ECL}$=1.5–1.6) in both MeCN and MeCN:H$_2$O. However, ECL efficiency in the annihilation study, (bpy)$_2$Ru(bphb)$^{3+}$/(bpy)$_2$Ru(bphb)$^{1+}$ ($\phi_{ECL}$=0.007), was much smaller than for the Ru(bpy)$_3^{3+}$/Ru(bpy)$_3^{1+}$ reference system ($\phi_{ECL}$=0.05). This is unexpected considering the nature of the photoluminescence and the results obtained in the bimetallic complex. Similarly, aqueous ECL in 0.2 M phosphate buffer (pH 7.5) with TPrA as coreactant yielded efficiency values for (bpy)$_2$Ru(bphb)$^{2+}$ ($\phi_{ECL}$=0.058) much lower than the Ru(bpy)$_3^{2+}$ reference system ($\phi_{ECL}$=1). These results reflect the sensitivity of the MLCT state to environment and the manner by which the excited state is formed. Moreover, in (bpy)$_2$Ru(bphb)$^{2+}$, only two of the four nitrogens in the BL are coordinated (i.e., one bpy arm in bphb, FIG. 1), in contrast to [(bpy)$_2$Ru]$_2$(bphb)$^{4+}$ where both bipyridines in bphb are coordinate via the lone pairs on the N's. In the ECL study, the exposure of the free bpy in bphb may permit easier quenching, e.g., by excess reduced state, thereby decreasing lurninescence. The ECL efficiencies for (bpy)$_2$Ru(bphb)$^{2+}$/TPrA in nonaqueous or partially aqueous media are higher where only the oxidized form is generated at the electrode.

As with [(bpy)$_2$Ru]$_2$(bphb)$^{4+}$, $\phi_{ECL}$ is less intense in (bpy)$_2$Ru(bphb)$^{2+}$/S$_2$O$_8^{2-}$ than in Ru(bpy)$_3^{2+}$/S$_2$O$_8^{2-}$, despite the higher photoluminescence of the former luminophore. This result may also reflect the unusually large intensity found with the Ru(bpy)$_3^{2+}$/S$_2$O$_8^{2-}$ reference (White and Bard, 1982; unpublished results). Under non-aqueous or partially aqueous conditions, Ru(bpy)$_3^{2+}$/S$_2$O$_8^{2-}$ displays an overall higher ECL intensity than either Ru(bpy)$_3^{1+}$/Ru(bpy)$_3^{3+}$ or Ru(bpy)$_3^{2+}$/TPrA under comparable experimental conditions (unpublished results). The reasons for this are unclear, but for solutions of identical concentrations, both [(bpy)$_2$Ru]$_2$(bphb)$^{4+}$ and (bpy)$_2$Ru(bphb)$^{2+}$ with S$_2$O$_8^{2-}$ give intensities about the same as those incorporating TPrA.

In both TPrA and S$_2$O$_8^{2-}$, $\phi_{ECL}$ is not greatly affected by a partially aqueous medium and, within experimental error, may increase slightly upon addition of water. This probably reflects the hydrophobicity of diimine ligands and complexes and the ability of MeCN to form a protective shell around the luminophore.

Mechanistically, ECL in the monometallic species appears to be analogous to Ru(bpy)$_3^{2+}$ (Tokel and Bard, 1972; White and Bard, 1982). Photochemically, excitation by a photon of light results in formation of a $^1$MLCT state with the electron localized in the $\pi^*$ orbitals of the BL. This is followed by intersystem crossing with subsequent formation of the triplet, $^3$MLCT, state from which luminescence occurs. ECL generated by any of the methods discussed above produce spectra (e.g., FIG. 6) identical to the photo-luminescence. Therefore, the same orbitals are presumed to be responsible, whether the $^3$MLCT state is formed electrochemically or photochemically. The energy of the emitting state ($\Delta$H), as judged by the emission maximum, is 2.0 eV. From the standard potentials of the relevant half-reactions, a value of –2.6 eV is obtained corresponding to the total free energy ($\Delta G_{ann}$) in the (bpy)$_2$Ru(bphb)$^{3+}$ (–1.06 V)/(bpy)$_2$Ru(bphb)$^{1+}$ (1.57 V) annihilation reaction (Faulkner and Bard, 1977; Faulkner and Glass, 1982). Correcting for entropy (T$\Delta$S~0.1 eV) gives a corrected value for $\Delta$H of 1.9 eV. For emission to occur by direct population of the emitting state, $\Delta G_{ann} > \Delta H - T\Delta S$ or $\Delta G_{ann} > \Delta H_{corr}$. Thus, the energy available in the annihilation sequence is well above that needed to form the $^3$MLCT state, making this an energy sufficient system (Faulkner and Bard, 1977; Faulkner and Glass, 1982).

By analogy to Ru(bpy)$_3^{2+}$ (equations 1–4) (Tokel and Bard, 1972; Rubinstein and Bard, 1981; Rubinstein et al., 1983; Ege et al., 1984; White and Bard, 1982), formation of (bpy)$_2$Ru(bphb)$^{2+*}$ via annihilation can be explained by the following process, equations 9 and 12 followed by:

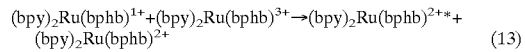
(13)

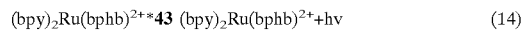
(14)

For solutions of (bpy)$_2$Ru(bphb)$^{2+}$ and (Bu$_4$N)$_2$S$_2$O$_8$, ECL was observed when the potential was swept negative enough to reduce the Ru system. Energetically, the relevant parameters in (bpy)$_2$Ru(bphb)$^{2+}$/S$_2$O$_8^{2-}$ include $\Delta H_{corr}$ (1.9 eV), the same as in annihilation ECL, and the standard potentials for the pertinent reduction half-reactions:

(15)

(Memming, 1964) and E° for the reduction of (bpy)$_2$Ru(bphb)$^{2+}$ (–1.05 V), equation 9, resulting in $\Delta$G~–4.0 eV. Clearly, the electron-transfer reaction between (bpy)$_2$Ru(bphb)$^{1+}$ and SO$_4^-$. is sufficient to produce triplet (bpy)$_2$Ru(bphb)$^{2+*}$ directly.

By analogy to Ru(bpy)$_3^{2+}$ (White and Bard, 1982), formation of (bpy)$_2$Ru(bphb)$^{2+*}$ occurs upon concomitant reduction of the luminophore and $S_2O_8^{2-}$, equations 9 and 15 followed by:

$$(bpy)_2Ru(bphb)^{1+} + SO_4^{-} \cdot \rightarrow (bpy)_2Ru(bphb)^{2+*} + SO_4^{2-} \quad (16)$$

The source of $SO_4^{-} \cdot$ is thought to be the reaction:

$$(bpy)_2Ru(bphb)^{1+} + S_2O_8^{2-} \rightarrow (bpy)_2Ru(bphb)^{2+} + SO_4^{-} \cdot \quad (17)$$

$SO_4^{-} \cdot$ can then react directly with the reduced luminophore to produce $(bpy)_2Ru(bphb)^{2+*}$, or as follows:

$$(bpy)_2Ru(bphb)^{2+} + SO_4^{-} \cdot \rightarrow (bpy)_2Ru(bphb)^{3+} + SO_4^{2-} \quad (18)$$

with excited state formation occurring via annihilation (equations 13 and 14).

In the TPrA reaction sequence, oxidation is believed to result in formation of a short-lived radical cation, which then loses a proton to form the strongly reducing intermediate $(CH_3CH_2CH_2)_2N(C \cdot HCH_2CH_3)$ (Leland and Powell, 1990; Noffsinger and Danielson, 1987):

$$TPrA-e^{-} \rightarrow TPrA^{+} \rightarrow (CH_3CH_2CH_2)_2N(C \cdot HCH_2CH_3) + h + E^{\circ} \sim 0.90 \text{ V vs. NHE} \quad (19)$$

(Richards and Bard, 1995). This radical is then available to react with the oxidized form of the luminophore, equation 12 followed by:

$$(CH_3CH_2CH_2)_2N(C \cdot HCH_2CH_3) + (bpy)_2Ru(bphb)^{3+} \rightarrow (bpy)_2Ru(bphb)^{2+*} + products \quad (20)$$

analogous to equation 5. Once again, the energetics of the electron-transfer reaction between $(bpy)_2Ru(bphb)^{3+}$ and the radical ($\Delta G \sim 2.5$ eV) is sufficient to directly produce the emitting $^3$MLCT state.

In considering the energetics of the ECL reactions in $[(bpy)_2Ru]_2(bphb)^{4+}$, one notes the similarity in the standard potentials for the relevant half-reactions (Table 1) and emission maxima (Table 2) with the monometallic patent compound. Thus, electron-transfer reactions in the $[(bpy)_2Ru]_2(bphb)^{6+}/[(bpy)_2Ru]_2(bphb)^{3+}$, $[(bpy)_2Ru]_2(bphb)^{4+}/S_2O_8^{2-}$, and $[(bpy)_2Ru]_2(bphb)^{4+}/TPrA$ systems all have sufficient energy to produce directly the excited state (Faulkner and Bard, 1977; Faulkner and Glass, 1982).

Interaction between metal centers in $[(dmb)_2Ru]_2(bphb)^{4+}$ and the bpy derivative is small, as determined from cyclic voltammetric scans (Baba et al., 1995). While this is one factor that results in enhanced photoluminescent and ECL efficiencies, it leads to complications in the interpretation of the ECL data because, electrochemically, oxidation of both metal centers occurs at nearly the same potential (i.e., with a statistical difference of 0.0356 V for non-interacting centers) (Bard and Faulkner, 1980) such that only a single unresolved 2-electron wave appears in both cyclic and square-wave voltammetry (FIG. 3). Similarly, the reduction waves are closely spaced, so that the direduced species is present during steps to negative potentials. The result is that, unlike the monomeric species $Ru(bpy)_3^{2+}$ and many other ECL-active species where only one-electron reduced and oxidized forms are produced, with the dimeric species two-electron oxidized and reduced forms are also produced at the electrode surface. However, as these diffuse toward the bulk solution they encounter parent species to produce the one-electron products in comproportionation reactions. The rates of these, as well as the electron-transfer reactions between oxidized and reduced species, are probably all near diffusion control.

The multimetallic ECL compounds of this invention contain at least two metal ions, preferable ruthenium or osmium. The metal ions are separated from one another by bridging ligands, such that one of the ligands bonded to each metal ion will also be bonded to at least one other metal ion. Suitable bridging ligands include dpp, bbpe, bphb, alkyl linked bis-bipyridines ($\alpha,\omega$-(2,2'-bipyrid-4-yl)-alkanes), 4,4'-bipyridines, and 1,2-bis(diphenylphosphine)ethane. The most preferred bridging ligand is bphb. The multimetallic compounds may be bimetallic, such as $[(bpy)_2Ru]_2(bphb)^{4+}$. Multimetallic compounds with more than two metal ions are also contemplated, involving long chains of linked chromophores or spherical or circular clusters of chromophores.

While at least one of the ligands on each of the metal ions is a bridging ligand which is also bonded to at least one other metal ion, each individual metal ion may also be bonded to a number of non-bridging ligands. The total number of ligands surrounding each metal ion is such that the total number of bonds made to both bridging and non-bridging ligands will equal the coordination number of the metal.

Non-bridging ligands may be monodentate or polydentate. Suitable polydentate ligands include aromatic and aliphatic ligands. Suitable aromatic polydentate ligands include aromatic heterocyclic ligands. Preferred aromatic heterocyclic ligands are nitrogen-containing, such as, for example, bipyridyl, bipyrazyl, terpyridyl, and phenanthrolyl. Suitable polydentate ligands may be unsubstituted or may be substituted with a number of substituents, including alkyl, substituted alkyl, aryl, substituted aryl, aralkyl, substituted aralkyl, carboxylate, carboxaldehyde, carboxamide, cyano, amino, hydroxy, imino, hydroxycarbonyl, aminocarbonyl amidine, guanidimium, ureide, sulfur-containing groups, phosphorous containing groups, and the carboxylate ester of N-hydroxysuccinimide. Suitable monodentate ligands include, for example, carbon monoxide, cyanide, isocyanides, halides, and aliphatic, aromatic and heterocyclic phosphines, amines, stibines, and arsines.

Particularly preferred embodiments of the multimetallic ECL compound include $[(bpy)_2Ru]_2(bphb)^{4+}$ and the various derivatives of $[(bpy)_2Ru]_2(bphb)^{4+}$. As used herein, "derivatives of $[(bpy)_2Ru]_2(bphb)^{4+}$" are compounds of the basic formula $[(bpy)_2Ru]_2(bphb)^{4+}$ wherein one or more of the ligands are substituted with a group that may be used to conjugate the ECL compound to another molecule or to change the solubility properties of the ECL compound.

In general, the multimetallic compounds may be conjugated to other molecules as part of systems for chemical or biochemical analysis. For example, the multimetallic compound may be used as: a label on a molecule that binds to another molecule of interest. After the binding partners are allowed to interact, the ECL compound labeling one of the binding partners will be exposed to chemical or electrochemical energy and, thereby, induced to emit electromagnetic radiation. Detection and quantification of the ECL label thus indirectly allows for the detection and quantification of the molecule of interest. Alternatively, the ECL compound may be used to label the molecule of interest directly.

There are many methods of detecting and quantifying the ECL compound present. The rate of energy input into the system can provide a measure of the luminescent species. Suitable measurements include, for example, measurements of electric current when the luminescent species is generated electrochemically, the rate of reductant utilization when the luminescent species is generated chemically or the absorption of electromagnetic energy in photoluminescent techniques, for example, the use of photomultiplier tubes, photodiodes, or phototransistors to produce electric currents proportional in magnitude to the incident light intensity.

Measurements may be either continuous, rate-based measurements or cumulative methods which accrue signal over a period of time.

Molecules that might be labeled by ECL compounds include, for example, whole cells, subcellular particles, nucleic acids, polysaccharides, proteins, glycoproteins, lipoproteins, lipopolysaccharides, polypeptides, cellular hormones, pharmacological agents, tranquilizers, barbiturates, alkaloids, steroids, vitamins, amino acids, sugars, and non-biological polymers. Molecules of particular interest for labeling include DNA polynucleotides and antibodies. Methods for conjugating the derivatized ECL compounds to these molecules are well known to those of skill in the art. The use of monometallic ECL compounds of use as labels of this sort are described in more detail in, for example, U.S. Pat. Nos. 5,221,605; 5,238,808; 5,310,687; 5,453,356; 5,714,089; and 5,731,147.

In addition to their use as labels, in other preferred embodiments of the invention, the multimetallic ECL compounds of this invention will be useful in various display devices or in devices for studying electron transfer and energy transfer processes at electrified interfaces. As part of some of these embodiments, the multimetallic compounds may be present in ECL cells in which the multimetallic compounds are present in cells containing two electrodes, an electrolyte solution, and a means of supplying an electric potential between the electrodes. Alternatively, assemblies of the multimetallic species contacting conducting surfaces might be used in analytical techniques that do not rely on the labeling of the molecule of interest or a molecule that can bind to the molecule of interest. For example, ECL compounds absorbed onto conducting substrates, such as ITO, gold films on glass, and platinum foil, may be useful in detecting oxalate in urine or blood samples or in detecting other molecules in solution.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed while still obtaining a like or similar result without departing from the spirit and scope of the invention.

EXAMPLE 1

ECL Measurements of $(bpy)_2Ru(bphb)$ and $[(bpy)_2Ru]_2(bphb)$

Materials $(bpy)_2Ru(bphb)(PF_6)_2$ and $[(bpY)_2Ru]_2(bphb)(PF_6)_4$ were available from previous studies (Baba et al., 1995; Liang et al., 1996). These complexes were metathesized to the chloride salts for the aqueous studies using tetra-n-butylammonium chloride ($Bu_4NCl$) dissolved in a minimal amount (<10 mL) of acetone. Tetra-n-butylammonium hexafluorophosphate ($Bu_4NPF_6$, SACHEM, Austin, Tex.) was used as the electrolyte and was recrystallized twice from 4:1 ethanol:water, dried in vacuo (110° C.), and stored in a vacuum desiccator before use. Tri-n-propylamine (TPrA, Aldrich) was used as received. Acetonitrile (MeCN) was spectroscopic quality (Burdick and Jackson) and stored over activated molecular sieves or in a Vacuum Atmosphere glovebox utilizing a He atmosphere. Deionized water from a Millipore Milli-Q system was used throughout. All other chemicals were reagent grade and used without further purification.

Methods

Cyclic voltammetric studies without photon detection utilized a CH Instruments (Memphis, Tenn.) Model 660 electrochemical work station. Cyclic voltammograms with photon detection employed a Princeton Applied Research 175 universal programmer (PAR, Princeton, N.J.), a Model 173 potentiostat/galvanostat, and an Omnigraphic 2000 x-y recorder (Houston Instruments, Austin, Tex.).

A Model AT200 charge-coupled device (CCD) camera system (Photometrics, Ltd., Phoenix, Ariz.) cooled to −120° C. was used to acquire ECL spectra as well as to obtain integrated emission intensities used in the calculation of ECL efficiencies. A Chemspec 100S (American Holographic, Littleton, Mass.) spectrometer (focal length, 10 cm) was used to record ECL spectra. Light intensities were integrated for 10 minutes to record ECL emission spectra. Total integrated light intensities for efficiency measurements were obtained by focusing the lens of the CCD camera on the working electrode surface. Light intensities were then integrated for 5 minutes and the value reported represents an average over this time period. The CCD camera and the configuration of the study have been described in detail elsewhere (McCord and Bard, 1991). Solutions used to obtain ECL spectra and emission intensities incorporated micromolar amounts of the Ru complex, 0.1 M $Bu_4NPF_6$, and 10 mM $S_2O_8^{2-}$ or 0.1 M TPrA.

Aqueous ECL efficiencies were determined using an Origen I electrochemiluminescent analyzer (IGEN, Inc., Rockville, Md.). This system employs a flow injection cell, Au working and counter electrodes, and a Ag/AgCl gel reference electrode (Yang et. al., 1994). Photon detection utilized a photomultiplier tube directly above the working electrode. Stock solutions of each reagent (i.e., $(bpy)_2Ru(bphb)^{2+}$ and $[(bpy)_2Ru]_2(bphb)^{4+}$) and the $Ru(bpy)_3^{2+}$ standard were made by dissolving an appropriate amount of the chloride salt in a 100 mL sample of 0.2 M phosphate buffer solution (pH 7.5) containing TPrA. All subsequent solutions were made by diluting these stock solutions with buffer.

All nonaqueous and mixed-solvent (50:50 (v/v) MeCN/$H_2O$) studies employed a conventional 3-electrode configuration. The cell was designed to fit in front of the entrance slit to the CCD camera and had a total volume of 4–5 mL. A platinum disk electrode (0.2 cm diameter) sealed in glass was employed as the working electrode with a Pt wire auxiliary electrode and a silver wire quasi-reference electrode (AgQRE). Ferrocene was added as an internal reference and all potentials are reported relative to the NHE electrode (Fc/Fc$^+$=0.665 V vs. NHE) (Gennet et al., 1985; Gagne et al., 1980).

The Pt working electrode was manually cleaned prior to each study by mechanical polishing on a felt pad (Buehler, Ltd., Lake Bluff, Ill.) with an aqueous slurry of 0.5 $\mu$m alumina (Buehler, Ltd.). The electrode was then rinsed with deionized water, immersed in concentrated nitric acid (~5 s), rinsed a second time, and then placed in a small beaker containing 95% EtOH followed by sonication for 5 minutes.

Solutions for ECL efficiency measurements were prepared in a drybox incorporating a He atmosphere or were prepared in air, purged with Ar, and then sealed in an air-tight cell. Before each ECL study, a cyclic voltammogram was recorded to establish the exact position of the redox processes versus the AgQRE. Digital simulations were performed using DigiSim 2.1 (Bioanalytical Systems, Inc.) interfaced with a PC.

Absorption spectra were recorded with an Aminco Bowman/Milton Roy Spectronic 3000 array spectrophotometer. Luminescence spectra were measured using an SLM Aminco SPF-500 spectrofluorometer. Relative photoluminescence quantum yields, $\phi_{em}$, were measured in deaerated (Ar bubbled for 20 minutes) MeCN solutions at room temperature as reported previously (Caspar and Meyer, 1983; Van Houten and Watts, 1976) with $Ru(bpy)_3(PF_6)_2$ as the standard, $\phi_{em}=0.086$ (Kawanishi et al., 1984).

The redox potentials, and spectroscopic and ECL properties of $(bpy)_2Ru(bphb)^{2+}$ and $(bpy)_2Ru(bphb)^{4+}$ are listed in Tables 1 and 2 below.

TABLE 1

Redox Potentials (E°)[a] for $(bpy)_2Ru(bphb)^{2+}$ and $(bpy)_2Ru(bphb)^{4+}$

| complex | oxidation | reductions | | |
|---|---|---|---|---|
| | | E° (V vs. NHE)[b] | | |
| $(bpy)_2Ru(bphb)^{2+}$ | +1.569 | −1.055 | −1.235 | −1.507 |
| $[(bpy)_2Ru]_2(bphb)^{4+}$ | +1.573 | −1.051 | −1.203 | −1.575 |

[a]$E° = (E_{pa} + E_{pc})/2$.
[b]Measured vs. Fc/Fc + (+0.665 V vs. NHE) in MeCN/0.1 M $(Bu_4N)_2PF_6$

TABLE 2

Spectroscopic and ECL Properties of $(bpy)_2Ru(bphb)^{2+}$ and $[(bpy)_2Ru]_2(bphb)^{4+}$

| solvent[a] | $\lambda_{em}$(nm) | $\phi_{em}$[b] | $\phi_{ann}$[c] | $\phi_{r'TPrA}$[d] | $\phi_{r'Per}$[e] |
|---|---|---|---|---|---|
| $(bpy)_2Ru(bphb)^{2+}$: | | | | | |
| MeCN[f, g] | 625 | 0.11 (±0.01) | 0.0066 (±0.001) | 1.5 (±0.3) | 0.4 (±0.08) |
| MeCN:H₂O[h] (1:1 v/v) | | | | 1.6 (±0.3) | 0.7 (±0.1) |
| H₂O[i] (pH~7) | | | | 0.058 (±0.01) | |
| $[(bpy)_2Ru]_2(bphb)^{4+}$: | | | | | |
| MeCN[f, g] | 624[j] | 0.158[j] (±0.03) | 0.16 | 2.6 (±0.5) | 0.6 (±0.1) |
| MeCN:H₂O[h] (1:1 v/v) | | | | 2.8 (±0.6) | 0.8 (±0.5) |
| H₂O[i] (pH~7) | | | | 2.0 (±0.4) | |

[a]Micromolar solutions at 298K degassed with Ar
[b]$\phi_{em}$ vs. $Ru(bpy)_3^{2+}$ (0.086) (Kawanishi et al., 1984)
[c]$\phi_{ECL}$ vs. $Ru(bpy)_3^{2+}$ (~0.05 for $Ru(bpy)_3^{2+}$)
[d]Relative efficiency, [TPrA] =0.15 M
[e]Relative efficiency, $[S_2O_8^{2-}]$ = 10 mM
[f]Micromolar solutions at 298 prepared in a glovebox with a He atmosphere
[g]0.1 M $Bu_4NPF_6$ as electrolyte
[h]$Bu_4NPF_6$:$Bu_4NClO_4$ as electrolyte
[i]0.2 M $PO_4^{3-}$ buffer (pH~7) as supporting electrolyte
[j]Recorded in MeCN at 298K All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and in the steps or in the sequence of steps of the methods described herein without departing from the concept, spirit, and scope of the invention. More specifically, it will be apparent that certain agents which are both chemically and physiologically related may be substituted for the agents described herein while still achieving the same or similar results. All such similar substitutes and modifications apparent to those skilled in the art are deemed to be within the spirit, scope, and concept of the invention as defined by the appended claims.

References

The following references, to the extent that they provide exemplary procedural or other details supplementary to those set forth herein, are specifically incorporated herein by reference.

U.S. Pat. No. 5,221,605 Bard and Whitesides
U.S. Pat. No. 5,238,808 Bard and Whitesides
U.S. Pat. No. 5,310,687 Bard and Whitesides
U.S. Pat. No. 5,453,356 Bard and Whitesides
U.S. Pat. No. 5,714,089 Bard and Whitesides
U.S. Pat. No. 5,731,147 Bard and Whitesides
Baba et al., Inorg. Chem., 34:1198, 1995.
Balzani, Supramolecular Photochemistry, NATO ASI Series D, Ellis Horwood, Chichester, UK, 214:135, 1987.
Bard and Faulkner, Electrochemical Methods Fundamentals and Applications, John Wiley and Sons; New York, p. 519, 1980.
Barigelletti et al., Inorg. Chem., 30:641, 1991.
Beley et al., J. Chem Soc., Chem. Commun., 1315, 1984.
Berger, Inorg. Chem., 19:1920, 1990.
Bezman and Faulkner, J. Am. Chem. Soc., 94:3699, 1972.
Blackburn et al., Clin. Chem., 37:1534, 1991.
Bock et al., J. Am. Chem. Soc., 96:4710, 1974.
Bock et al., J. Am. Chem. Soc., 101:4815, 1979.
Bolinger et al., J. Chem. Soc., Chem. Commun., 796, 1985.
Boyde et al., J. Am. Chem. Soc., 112–1395, 1990.
Brauenstein et al., Inorg. Chem., 23:857, 1984.
Brewer et al., Inorg. Chem., 24:882, 1986.
Callahan et al., J. Am. Chem. Soc., 96:7829, 1974.
Callahan et al., Inorg. Chem., 14:1443, 1975.
Campagna et al., J. Chem. Soc., Chem. Commun., 1500, 1989.
Campagna et al., J. Am. Chem. Soc., 114:2944, 1992.
Caspar and Meyer, J. Am. Chem. Soc., 105:5583, 1983.
Collin and Souvage, Coord. Chem. Rev., 93:245, 1989.
Creutz, Prog. Inorg. Chem., 30:1, 1983.
Creutz and Taube, J. Am. Chem. Soc., 91:3988, 1969.
Creutz and Taube, J. Am. Chem. Soc., 95:1086, 1972.
Demas and Crosby, J. Am. Chem. Soc., 93:2841, 1971.
Dose and Wilson, Inorg. Chem., 17:2660, 1978.
Duesing et al., J. Am. Chem. Soc., 112:5378, 1990.
Ege et al., Anal. Chem., 56:2413, 1984.
Elias and Drago, Inorg. Chem., 11:415, 1972.
Faulkner and Bard, In: Electroanalytical Chemistry, A. J. Bard, ed., Marcel Dekker, New York, 10:1–95, 1977.
Faulkner and Glass, In: Chemical and Biological Generation of Excited States, Adam and Cilento, eds., Academic Press, New York, p. 191, 1982.
Flanagan et al., J. Am. Chem. Soc., 100:4248, 1978.
Gagne et al., Inorg. Chem., 19:2855, 1980.
Gennet et al., J. Phys. Chem., 89:2787, 1985.
Goldsby and Meyer, Inorg. Chem., 23:3002, 1984.
Hage et al., J. Am. Chem. Soc., 112:9245, 1990.
Hanan et al., Angew. Chem. Int. Ed. Engl., 34:1122, 1995.
Hawecker et al., J. Chem. Soc., Chem. Commun., 328, 1984.
Hunziker and Ludi, J. Am. Chem. Soc., 99:7870, 1977.
Itoh and Honda, Chem. Lett., 99, 1979.
Juris et al., Coord. Chem. Rev., 84:85, 1988.
Kalyanasundaram, Coord. Chem. Rev., 46:159, 1982.
Kawanishi et al., Riken Q, 78:212, 1984.
Kim et al., Chem. Phys. Lett., 121:543, 1985.
Knight and Greenway, Analyst, 119:879, 1994.
Krentzien and Taube, J. Am. Chem. Soc., 98:6379, 1976.
Laser and Bard, J. Electrochem. Soc., 122:632, 1975.

Leland and Powell, *J. Electrochem. Soc.*, 137:3127, 1990.
Liang et al., *J. Phys. Chem.*, 100:408, 1996.
Maness et al., *J. Phys. Chem.*, 98:3993, 1994.
McCord and Bard, *J. Electroanal Chem. Soc.*, 318:91, 1991.
Memming, *J. Electrochem. Soc.*, 116:785, 1964.
Meyer, *Acc. Chem. Res.*, 11:94, 1978.
Meyer, *Acc. Chem. Res.*, 22:163, 1989.
Molnar et al., *J. Photochem. Photobiol. A. Chem.*, 80:315, 1994.
Mussel and Nocera, *Inorg. Chem.*, 29:3711, 1990.
Navon and Sutin, *Inorg. Chem.*, 13:2159, 1974.
Noffsinger and Danielson, *Anal. Chem.*, 59:865, 1987.
Ouyang et al., *J. Phys. Chem.*, 90:3841, 1986.
Paris and Brandt, *J. Am. Chem. Soc.*, 81:5001, 1959.
Powers et al., *Inorg. Chem.*, 15:894, 1976.
Rasmussen et al., *Inorg. Chem.*, 19:3926, 1990.
Richards and Bard, *Anal. Chem.*, 34:3140, 1995.
Richardson et al., *Inorg. Chem.*, 21:3136, 1982.
Richter and Brewer, *Inorg. Chem.*, 32:2827, 1993.
Richter and Brewer, *Inorg. Chem.*, 32:5762, 1993.
Richter et al., *Anal. Chem.*, 68:4370, 1996.
Robin and Day, *Adv. Inorg. Chem. Radiochem.*, 10:247, 1967.
Roundhill, *Photochemistry and Photophysics of Metal Complexes,* Plenum, New York, 1994.
Rubinstein and Bard, *J. Am. Chem. Soc.*, 103:512, 1981.
Rubinstein et al., *Anal. Chem.*, 55:1580, 1983.
Ryu et al., *J. Am. Chem. Soc,* 114:430, 1992.
Sutin and Creutz, *Adv. Chem, Ser.*, 168:1, 1978.
Sutin and Creutz, *Pure Appl. Chem.*, 52:2717, 1986.
Tezuka et al., *J. Am. Chem. Soc.*, 104:6834, 1982.
Tokel and Bard, *J. Am. Chem. Soc.*, 94:2862, 1972.
Tom and Taube, *J. Am. Chem. Soc.*, 97:5310,1975.
Van Houten and Watts, *J. Am. Chem. Soc.*, 98:4853, 1976.
Vogler and Kunkeley, *Angew. Chem. Int. Ed. Engl.*, 23:316, 1984.
Wallace and Bard, *J. Phys. Chem.*, 83:1350, 1979.
White and Bard, *J. Am. Chem. Soc.*, 104:6891, 1982.
Yang et al., *Bio/Technology,* 12:193, 1994.

What is claimed is:

1. A method of determining the presence of a chemical moiety, the method comprising
   (a) forming a reagent mixture containing the chemical moiety, or the chemical moiety and an agent which upon exposure of the reagent mixture to electrochemical energy forms either a reductant or an oxidant, said chemical moiety having the formula:

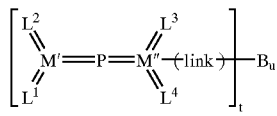

$$\left[ \begin{array}{c} L^2 \\ \diagdown \\ M'=P=M''\text{-(link)} \\ \diagup \\ L^1 \end{array} \begin{array}{c} L^3 \\ \diagup \\ \diagdown \\ L^4 \end{array} \right]_t B_u$$

wherein:
M' and M" are independently selected from the group consisting of ruthenium and osmium;
$L^1, L^2, L^3,$ and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of said substituted ligands is substituted by an alkyl, aryl, aralkyl, carboxylate, carboxaldehyde, carboxamide, cyano, amino, hydroxycarbonyl, hydroxyamino, aminocarbonyl, amidine, guanidinium, ureide, sulfur-containing group, phosphorus-containing group, or the carboxylate ester of N-hydroxysuccinimide, each of said ligands being the same or not the same as each other ligand;
P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;
B is a biological substance, a synthetic substance which is capable of competing with a biological substance in a competitive binding reaction with a complementary material, or a non-biological polymer;
t is an integer equal to or greater than 1;
u is an integer equal to or greater than 1;
said link being covalent bonding linking B with at least one of $L^1, L^2, L^3,$ and $L^4$;
$L^1, L^2, L^3, L^4$, P and B being of such composition and number that the chemical moiety is capable of being induced to electrochemiluminesce;
   (b) exposing the reagent mixture to electrochemical energy the potential of which oscillates between a potential sufficiently positive to oxidize the chemical moiety and a potential sufficiently negative to reduce the chemical moiety, or to electrochemical energy such that said chemical moiety is oxidized and the agent forms a reductant, or such that said chemical moiety is reduced and the agent forms an oxidant, thereby to induce the chemical moiety to electrochemiluminesce; and
   (c) detecting emitted luminescence thereby to determine the presence of the chemical moiety.

2. The method of claim 1, wherein said link is one or more amide linkages, ester or thioester linkages, or ether or thioether linkages, each said linkage covalently bonding B with one of $L^1, L^2, L^3,$ and $L^4$.

3. The method of claim 2, wherein said link is one or more amide linkages, each of said linkages covalently bonding B with one of $L^1, L^2, L^3,$ and $L^4$.

4. The method of claim 1, wherein both M' and M" are ruthenium.

5. The method of claim 1, wherein both M' and M" are osmium.

6. The method of claim 1, wherein M' is osmium and M" is ruthenium.

7. The method of claim 4, wherein P is bphb.

8. The method of claim 7, wherein $L^1, L^2, L^3,$ and $L^4$ are independently selected from the group consisting of bipyridyl and substituted bipyridyl.

9. The method of claim 8, wherein at least one of $L^1, L^2, L^3,$ and $L^4$ is substituted bipyridyl.

10. The method of claim 1, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

11. The method of claim 10, wherein B is a serum-derived antibody or a monoclonal antibody.

12. The method of claim 10, wherein B is a nucleotide or polynucleotide.

13. The method of claim 10, wherein B is T4 thyroid hormone.

14. A method of determining the presence of an analyte of interest which binds to a chemical moiety, said method comprising
   (a) forming a reagent mixture compnsing the chemical moiety, or comprising the chemical moiety and an agent which upon exposure of the reagent mixture to electrochemical energy forms either a reductant or an oxidant, and the analyte of interest; such that the chemical moiety and the analyte specifically bind to one another, said chemical moiety having the formula

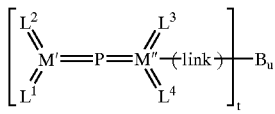

wherein:
M' and M" are independently selected from the group consisting of ruthenium and osmium;
$L^1$, $L^2$, $L^3$, and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of said substituted ligands is substituted by an alkyl, aryl, aralkyl, carboxylate, carboxaldehyde, carboxamide, cyano, amino, hydroxycarbonyl, hydroxyamino, aminocarbonyl, amidine, guanidinium, ureide, sulfur-containing group, phosphorus-containing group, or the carboxylate ester of N-hydroxysuccinimide, each of said ligands being the same or not the same as each other ligand;
P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;
B is a biological substance, or a synthetic substance which is capable of competing with a biological substance in a competitive binding reaction with a complementary material, said biological substance or synthetic substance being capable of specifically binding to the analyte of interest;
t is an integer equal to or greater than 1;
u is an integer equal to or greater than 1;
said link being covalent bonding linking B with at least one of $L^1$, $L^2$, $L^3$, and $L^4$;
$L^1$, $L^2$, $L^3$, $L^4$, P and B being of such composition and number that the chemical moiety is capable of being induced to electrochemiluminesce;
(b) exposing the reagent mixture to electrochemical energy the potential of which oscillates between a potential sufficiently positive to oxidize the chemical moiety and a potential sufficiently negative to reduce the chemical moiety, or to electrochemical energy such that said chemical moiety is oxidized and the agent forms a reductant, or such that said chemical moiety is reduced and the agent forms an oxidant, thereby to induce the chemical moiety to electrochemiluminesce; and
(c) detecting emitting luminescence thereby to determine the presence of the analyte of interest.

15. The method of claim 14, wherein said link is one or more amide linkages, ester or thioester linkages, or ether or thioether linkages, each said linkage covalently bonding B with one of $L^1$, $L^2$, $L^3$, and $L^4$.

16. The method of claim 15, wherein said link is one or more amide linkages, each said linkage covalently bonding B with one of $L^1$, $L^2$, $L^3$, and $L^4$.

17. The method of claim 14, wherein both M' and M" are ruthenium.

18. The method of claim 14, wherein both M' and M" are osmium.

19. The method of claim 14, wherein M' is osmium and M" is ruthenium.

20. The method of claim 17, wherein P is bphb.

21. The method of claim 20, wherein $L^1$, $L^2$, $L^3$, and $L^4$ are independently selected from the group consisting of bipyridyl and substituted bipyridyl.

22. The method of claim 21, wherein at least one of $L^1$, $L^2$, $L^3$, and $L^4$ is substituted bipyridyl.

23. The method of claim 14, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

24. The method of claim 23, wherein B is a serum-derived antibody or a monoclonal antibody.

25. The method of claim 23, wherein B is a nucleotide or polynucleotide.

26. The method of claim 23, wherein B is T4 thyroid hormone.

27. The method of claim 14, wherein said analyte is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

28. The method of claim 27, wherein said analyte is insulin, digoxin, digitoxin, or T4 thyroid hormone.

29. The method of claim 27, wherein said analyte is a fungus.

30. The method of claim 27, wherein said analyte is an antibody.

31. The method of claim 27, wherein said analyte is a pharmacological agent or sugar.

32. A competitive binding method of determining the presence of an analyte of interest wherein the analyte and a chemical moiety bind competitively to a complementary material, said method comprising
(a) forming a reagent mixture comprising the analyte of interest, the complementary material and the chemical moiety, or the chemical moiety and an agent which upon exposure of the reagent mixture to electrochemical energy forms either a reductant or an oxidant, such that the chemical moiety and the analyte of interest bind competitively to the complementary material; said chemical moiety having the formula

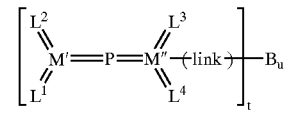

wherein:
M' and M" are independently selected from the group consisting of ruthenium and osmium;
$L^1$, $L^2$, $L^3$, and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of said substituted ligands is substituted by an alkyl, aryl, aralkyl, carboxylate, carboxaldehyde, carboxamide, cyano, amino, hydroxycarbonyl, hydroxyamino, aminocarbonyl, amidine, guanidinium, ureide, sulfur-containing group, phosphorus-containing group, or the carboxylate ester of N-hydroxysuccinimide, each of said ligands being the same or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a biological substance, or a synthetic substance which is capable of competing with a biological substance in a competitive binding reaction with said complementary material, said biological substance or synthetic substance being capable of binding to the complementary material;

t is an integer equal to or greater than 1;

u is an integer equal to or greater than 1;

said link being covalent bonding linking B with at least one of $L^1$, $L^2$, $L^3$, and $L^4$;

$L^1$, $L^2$, $L^3$, $L^4$, P and B being of such composition and number that the chemical moiety is capable of being induced to electrochemiluminesce;

(b) exposing the reagent mixture to electrochemical energy the potential of which oscillates between a potential sufficiently positive to oxidize the chemical moiety and a potential sufficiently negative to reduce the chemical moiety, or to electrochemical energy such that said chemical moiety is oxidized and the agent forms a reductant, or such that said chemical moiety is reduced and the agent forms an oxidant, thereby to induce the chemical moiety to electrochemiluminesce; and (c) detecting emitted luminescence thereby to determine the presence of the analyte of interest.

33. The method of claim 32, wherein said link is one or more amide linkages, ester or thioester linkages, or ether or thioether linkages, each said linkage covalently bonding B with one of $L^1$, $L^2$, $L^3$, and $L^4$.

34. The method of claim 33, wherein said link is one or more amide linkages, each said linkage covalently bonding B with one of $L^1$, $L^2$, $L^3$, and $L^4$.

35. The method of claim 32, wherein both M' and M" are ruthenium.

36. The method of claim 32, wherein both M' and M" are osmium.

37. The method of claim 32, wherein M' is osmium and M" is ruthenium.

38. The method of claim 35, wherein P is bphb.

39. The method of claim 38, wherein $L^1$, $L^2$, $L^3$, and $L^4$ are independently selected from the group consisting of bipyridyl and substituted bipyridyl.

40. The method of claim 39, wherein at least one of $L^1$, $L^2$, $L^3$, and $L^4$ is substituted bipyridyl.

41. The method of claim 32, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

42. The method of claim 41, wherein B is a serum-derived antibody or a monoclonal antibody.

43. The method of claim 42, wherein B is a nucleotide or polynucleotide.

44. The method of claim 42, wherein B is T4 thyroid hormone.

45. The method of claim 32, wherein said analyte is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

46. The method of claim 45, wherein said analyte is insulin, digoxin, digitoxin, or T4 thyroid hormone.

47. The method of claim 45, wherein said analyte is a fungus.

48. The method of claim 45, wherein said analyte is an antibody.

49. The method of claim 45, wherein said analyte is a pharmacological agent or sugar.

50. A system for determining the presence of a chemical moiety, said system comprising (a) a reagent mixture comprising the chemical moiety, or the chemical moiety and an agent which upon exposure of the reagent mixture to electrochemical energy forms either a reductant or an oxidant, said chemical moiety having the formula

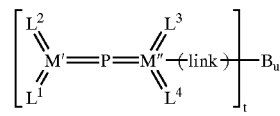

wherein:

M' and M" are independently selected from the group consisting of ruthenium and osmium;

$L^1$, $L^2$, $L^3$, and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of said substituted ligands is substituted by an alkyl, aryl, aralkyl, carboxylate, carboxaldehyde, carboxamide, cyano, amino, hydroxycarbonyl, hydroxyamino, aminocarbonyl, amidine, guanidinium, ureide, sulfur-containing group, phosphorus-containing group, or the carboxylate ester of N-hydroxysuccinimide, each of said ligands being the same or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a biological substance, a synthetic substance which is capable of competing with a biological substance in a competitive binding reaction with a complementary material, or a non-biological polymer;

t is an integer equal to or greater than 1;

u is an integer equal to or greater than 1;

said link being covalent bonding linking B with at least one of $L^1$, $L^2$, $L^3$, and $L^4$;

$L^1$, $L^2$, $L^3$, $L^4$, P and B being of such composition and number that the chemical moiety is capable of being induced to electrochemiluminesce;

(b) means for exposing the reagent mixture to electrochemical energy the potential of which oscillates between a potential sufficiently positive to oxidize the chemical moiety and a potential sufficiently negative to reduce the chemical moiety, or to electrochemical energy such that said chemical moiety is oxidized and the agent forms a reductant, or such that said chemical moiety is reduced and the agent forms an oxidant, thereby to induce the chemical moiety to electrochemiluminesce; and (c) means for detecting emitted luminescence thereby to determine the presence of the chemical moiety.

51. The system of claim 50, wherein said link is one or more amide linkages, ester or thioester linkages, or ether or thioether linkages, each said linkage covalently bonding B with one of $L^1$, $L^2$, $L^3$, and $L^4$.

52. The system of claim 51, wherein said link is one or more amide linkages, each said linkage covalently bonding B with one of $L^1$, $L^2$, $L^3$, and $L^4$.

53. A system for determining the presence of an analyte of interest which binds to a chemical moiety, which system comprises (a) a reagent mixture comprising the chemical moiety, or comprising the chemical moiety and an agent which upon exposure of the reagent mixture to electrochemical energy forms either a reductant or an oxidant, and the analyte of interest; said chemical moiety having the formula

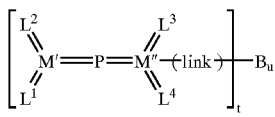

wherein:

M' and M" are independently selected from the group consisting of ruthenium and osmium;

$L^1$, $L^2$, $L^3$, and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of said substituted ligands is substituted by an alkyl, aryl, aralkyl, carboxylate, carboxaldehyde, carboxamide, cyano, amino, hydroxycarbonyl, hydroxyamino, aminocarbonyl, amidine, guanidinium, ureide, sulfur-containing group phosphorus-containing group, or the carboxylate ester of N-hydroxysuccinimide, each of said ligands being the same or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a biological substance, or a synthetic substance which is capable of competing with a biological substance in a competitive binding reaction with a complementary material, or a synthetic substance being capable of binding to the analyte of interest;

t is an integer equal to or greater than 1;

u is an integer equal to or greater than 1;

said link being covalent bonding linking B with at least one of $L^1$, $L^2$, $L^3$, and $L^4$;

$L^1$, $L^2$, $L^3$, $L^4$, P and B being of such composition and number that the chemical moiety is capable of being induced to electrochemiluminesce;

(b) means for contacting the chemical moiety with the analyte of interest to form a reagent mixture;

(c) means for exposing the reagent mixture to electrochemical energy the potential of which oscillates between a potential sufficiently positive to oxidize the chemical moiety and a potential sufficiently negative to reduce the chemical moiety, or to electrochemical energy such that said chemical moiety is oxidized and the agent forms a reductant, or such that said chemical moiety is reduced and the agent forms an oxidant, thereby to induce the chemical moiety to electrochemiluminesce; and (d) means for detecting emitted luminescence thereby to determine the presence of the chemical moiety.

54. The system of claim 53, wherein said link is one or more amide linkages, ester or thioester linkages, or ether or thioether linkages, each said linkage covalently bonding B with one of $L^1$, $L^2$, $L^3$, and $L^4$.

55. The system of claim 54, wherein said link is one or more amide linkages, each said linkage covalently bonding B with one of $L^1$, $L^2$, $L^3$, and $L^4$.

56. A composition which comprises a chemical moiety having the formula

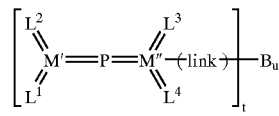

wherein:

M' and M" are independently selected from the group consisting of ruthenium and osmium;

$L^1$, $L^2$, $L^3$, and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of said substituted ligands is substituted by an alkyl, aryl, aralkyl, carboxylate, carboxaldehyde, carboxamide, cyano, amino, hydroxycarbonyl, hydroxyamino, aminocarbonyl, amidine, guanidinium, ureide, sulfur-containing group, phosphorus-containing group, or the carboxylate ester of N-hydroxysuccinimide, each of said ligands being the same or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a biological substance, a synthetic substance which is capable of competing with a biological substance in a competitive binding reaction with a complementary material, or a non-biological polymer;

t is an integer equal to or greater than 1;

u is an integer equal to or greater than 1;

said link being covalent bonding linking B with at least one of $L^1$, $L^2$, $L^3$, and $L^4$;

$L^1$, $L^2$, $L^3$, $L^4$, P and B being of such composition and number that the chemical moiety is capable of being induced to electrochemiluminesce; and one or more different chemical moieties each of which is capable of being induced to luminesce at a wavelength different from that at which any other of the chemical moieties luminesces.

57. The composition of claim 56, wherein said link is one or more amide linkages, ester to thioester linkages, or ether or thioether linkages, each said linkage covalently bonding B with one of $L^1$, $L^2$, $L^3$, and $L^4$.

58. The composition of claim 57, wherein said link is one or more amide linkages, each said linkage covalently bonding B with one of $L^1$, $L^2$, $L^3$, and $L^4$.

59. The composition of claim 56, wherein both M' and M" are ruthenium.

60. The method of claim 56, wherein both M' and M" are osmium.

61. The method of claim 56, wherein M' is osmium and M" is ruthenium.

62. The composition of claim 59, wherein P is bphb.

63. The composition of claim 62, wherein $L^1$, $L^2$, $L^3$, and $L^4$ are independently selected from the group consisting of bipyridyl and substituted bipyridyl.

64. The composition of claim 63, wherein at least one of $L^1$, $L^2$, $L^3$, and $L^4$ is substituted bipyridyl.

65. The composition of claim 56, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

66. The composition of claim 65, wherein B is a serum-derived antibody or a monoclonal antibody.

67. The composition of claim 65, wherein B is a nucleotide or polynucleotide.

68. The composition of claim 65, wherein B is T4 thyroid hormone.

69. A method of determining the presence of a chemical moiety having the formula:

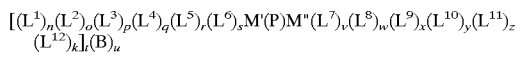

wherein:

M' and M" are independently selected from ruthenium and osmium;

$L^1$, $L^2$, $L^3$, $L^4$, $L^5$, and $L^6$ are ligands of M', each of which may be the same as or not the same as each other ligand;

$L^7$, $L^8$, $L^9$, $L^{10}$, $L^{11}$, and $L^{12}$ are ligands of M", each of which may be the same as or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a substance which is attached to one or more of $L^1$, $L^2$, $L^3$, $L^4$, $L^5$, $L^6$, $L^7$, $L^8$, $L^9$, $L^{10}$, $L^{11}$, and $L^{12}$;

each of n, o, p, q, r, s, v, w, x, y, z, and k is zero or an integer;

t is an integer equal to or greater than 1;

u is an integer equal to or greater than 1;

$L^1$, $L^2$, $L^3$, $L^4$, $L^5$, $L^6$, $L^7$, $L^8$, $L^9$, $L^{10}$, $L^{11}$, $L^{12}$, P and B being of such composition and number that the chemical moiety can be induced to electrochemiluminesce and the total number of bonds to M' provided by the ligands of M' equals the coordination number of M', and; and the total number of bonds to M" provided by the ligands of M" equals the coordination number of M";

the method comprising:
 a) forming a reagent mixture under suitable conditions containing the chemical moiety;
 b) inducing the chemical moiety to electrochemiluminesce by exposing the reagent mixture to electrochemical energy; and
 c) detecting emitted luminescence and thereby determining the presence of the chemical moiety.

70. The method of claim 69, wherein B is further defined as a substance covalently bound to one or more of $L^1$, $L^2$, $L^3$, $L^4$, $L^5$, $L^6$, $L^7$, $L^8$, $L^9$, $L^{10}$, $L^{11}$, or $L^{12}$ through one or more amide linkages.

71. The method of claim 69, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

72. The method of claim 71, wherein B is a serum-derived antibody or a monoclonal antibody.

73. The method of claim 71, wherein B is a nucleotide or polynucleotide.

74. The method of claim 71, wherein B is T4 thyroid hormone.

75. A method of determining the presence of an analyte of interest which binds to a chemical moiety, said moiety having the formula:

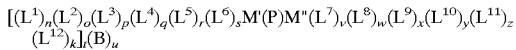

wherein:

M' and M" are independently selected from ruthenium and osmium;

$L^1$, $L^2$, $L^3$, $L^4$, $L^5$, and $L^6$ are ligands of M', each of which may be the same as or not the same as each other ligand;

$L^7$, $L^8$, $L^9$, $L^{10}$, $L^{11}$, and $L^{12}$ are ligands of M", each of which may be the same as or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a substance which is attached to one or more of $L^1$, $L^2$, $L^3$, $L^4$, $L^5$, $L^6$, $L^7$, $L^8$, $L^9$, $L^{10}$, $L^{11}$, and $L^{12}$;

each of n, o, p, q, r, s, v, w, x, y, z, and k is zero or an integer;

t is an integer equal to or greater than 1;

u is an integer equal to or greater than 1;

$L^1$, $L^2$, $L^3$, $L^4$, $L^5$, $L^6$, $L^7$, $L^8$, $L^9$, $L^{10}$, $L^{11}$, $L^{12}$, P and B being of such composition and number that the chemical moiety can be induced to electrochemiluminesce and the total number of bonds to M' provided by the ligands of M' equals the coordination number of M', and; and the total number of bonds to M" provided by the ligands of M" equals the coordination number of M";

the method comprising:
 a) contacting the analyte with the chemical moiety under suitable conditions so as to form a reagent mixture such that the B substance of the chemical moiety and the analyte are capable of binding with one another;
 b) inducing the chemical moiety to electrochemiluminesce by exposing the reagent mixture to electrochemical energy; and
 c) detecting emitted luminescence and thereby determining the presence of the analyte of interest.

76. The method of claim 75, wherein B is further defined as a substance covalently bound to one or more of $L^1$, $L^2$, $L^3$, $L^4$, $L^5$, $L^6$, $L^7$, $L^8$, $L^9$, $L^{10}$, $L^{11}$, or $L^{12}$ through one or more amide linkages.

77. The method of claim 75, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

78. The method of claim 77, wherein B is a serum-derived antibody or a monoclonal antibody.

79. The method of claim 77, wherein B is a nucleotide or polynucleotide.

80. The method of claim 77, wherein B is T4 thyroid hormone.

81. The method of claim 75, wherein said analyte is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

82. The method of claim 81, wherein said analyte is insulin, digoxin, digitoxin, or T4 thyroid hormnone.

83. The method of claim 81, wherein said analyte is a fungus.

84. The method of claim 81, wherein said analyte is an antibody.

85. The method of claim 81, wherein said analyte is a pharmacological agent or sugar.

86. A competitive binding method of determining the presence of an analyte of interest wherein the analyte and a chemical moiety bind competitively to a chemical material, the chemical moiety having the formula:

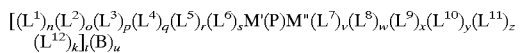

wherein:

M' and M" are independently selected from ruthenium and osmium;

$L^1, L^2, L^3, L^4, L^5$, and $L^6$ are ligands of M', each of which may be the same as or not the same as each other ligand;

$L^7, L^8, L^9, L^{10}, L^{11}$, and $L^{12}$ are ligands of M", each of which may be the same as or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(dipheriylphosphine)ethane;

B is a substance which is attached to one or more of $L^1$, $L^2, L^3, L^4, L^5, L^6, L^7, L^8, L^9, L^{10}, L^{11}$, and $L^{12}$;

each of n, o, p, q, r, s, v, w, x, y, z, and k is zero or an integer;

t is an integer equal to or greater than 1;

u is an integer equal to or greater than 1;

$L^1, L^2, L^3, L^4, L^5, L^6, L^7, L^8, L^9, L^{10}, L^{11}, L^{12}$, P and B being of such composition and number that the chemical moiety can be induced to electrochemiluminesce and the total number of bonds to M' provided by the ligands of M' equals the coordination number of M', and; and the total number of bonds to M" provided by the ligands of M" equals the coordination number of M";

the method comprising:
a) binding the material, the B substance of the chemical moiety and the analyte under suitable conditions such that the chemical moiety and the analyte are capable of competitively binding with said material so as to form a reagent mixture containing said chemical moiety;
b) inducing the chemical moiety to electrochemiluminesce by exposing the reagent mixture to electrochemical energy; and
c) detecting emitted luminescence and thereby determining the analyte of interest.

87. The method of claim 86, wherein B is further defined as a substance covalently bound to one or more of $L^1, L^2, L^3$, $L^4, L^5, L^6, L^7, L^8, L^9, L^{10}, L^{11}$, or $L^{12}$ through one or more amide linkages.

88. The method of claim 86, wherein B is the same substance as said analyte.

89. The method of claim 86, wherein said material is a whole cell, subcellular particle, nucleic acid, polysaccharide, protein, lipoprotein, lipopolysaccharide, glycoprotein, polypeptide, cellular metabolite, hormone, tranquilizer, barbiturate, alkaloid, steroid, vitamin, or amino acid.

90. The method of claim 89, wherein said chemical material is a serum-derived antibody or a monoclonal antibody.

91. The method of claim 89, wherein said chemical material is a DNA or RNA fragment.

92. The method of claim 86, further defined as a competitive binding method wherein the material is fixed to an insoluble matrix.

93. The method of claim 92, further defined as a heterogeneous method wherein the material is a monoclonal antibody and the insoluble matrix is the surface of an assay vessel.

94. The method of claim 92, further defined as a homogeneous method wherein the material is a monoclonal antibody and the insoluble matrix is the surface of an assay vessel.

95. The method of claim 86, wherein said material is a pharmacological agent or sugar.

96. The method of claim 86, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

97. The method of claim 96, wherein B is a serum-derived antibody or a monoclonal antibody.

98. The method of claim 96, wherein B is a nucleotide or polynucleotide.

99. The method of claim 96, wherein B is T4 thyroid hormone.

100. The method of claim 86, wherein said analyte is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

101. The method of claim 100, wherein said analyte is insulin, digoxin, digitoxin, or T4 thyroid hormone.

102. The method of claim 100, wherein said analyte is a fungus.

103. The method of claim 100, wherein said analyte is an antibody.

104. The method of claim 100, wherein said analyte is a pharmacological agent or sugar.

105. A system for determining the presence of a chemical moiety having the formula:

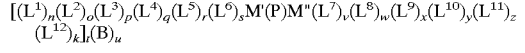

wherein:

M' and M" are independently selected from ruthenium and osmium;

$L^1, L^2, L^3, L^4, L^5$, and $L^6$ are ligands of M', each of which may be the same as or not the same as each other ligand;

$L^7, L^8, L^9, L^{10}, L^{11}$, and $L^{12}$ are ligands of M", each of which may be the same as or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a substance which is attached to one or more of $L^1$, $L^2$, $L^3$, $L^4$, $L^5$, $L^6$, $L^7$, $L^8$, $L^9$, $L^{10}$, $L^{11}$, and $L^{12}$;

each of n, o, p, q, r, s, v, w, x, y, z, and k is zero or an integer;

t is an integer equal to or greater than 1;

u is an integer equal to or greater than 1;

$L^1$, $L^2$, $L^3$, $L^4$, $L^5$, $L^6$, $L^7$, $L^8$, $L^9$, $L^{10}$, $L^{11}$, $L^{12}$, P and B being of such composition and number that the chemical moiety can be induced to electrochemiluminesce and the total number of bonds to M' provided by the ligands of M' equals the coordination number of M', and; and the total number of bonds to M" provided by the ligands of M" equals the coordination number of M";

the system comprising:
  a) a reagent mixture comprising the chemical moiety;
  b) means for inducing the chemical moiety to electrochemiluminesce; and
  c) means for detecting emitted luminescence.

106. The system of claim 105, wherein the reagent mixture also comprises one or more different chemical moieties each of which can be induced to luminesce at a different wavelength.

107. The system of claim 105, wherein the reagent mixture also comprises one or more different chemical moieties each of which can be induced to luminesce by exposure to energy of a different value or from a different source.

108. A system for determining the presence of an analyte of interest which binds to a chemical moiety, the moiety having the structural formula:

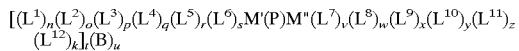

wherein:
  M' and M" are independently selected from ruthenium and osmium;
  $L^1$, $L^2$, $L^3$, $L^4$, $L^5$, and $L^6$ are ligands of M', each of which may be the same as or not the same as each other ligand;
  $L^7$, $L^8$, $L^9$, $L^{10}$, $L^{11}$, and $L^{12}$ are ligands of M", each of which may be the same as or not the same as each other ligand;
  P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;
  B is a substance which is attached to one or more of $L^1$, $L^2$, $L^3$, $L^4$, $L^5$, $L^6$, $L^7$, $L^8$, $L^9$, $L^{10}$, $L^{11}$, and $L^{12}$;
  each of n, o, p, q, r, s, v, w, x, y, z, and k is zero or an integer;
  t is an integer equal to or greater than 1;
  u is an integer equal to or greater than 1;
  $L^1$, $L^2$, $L^3$, $L^4$, $L^5$, $L^6$, $L^7$, $L^8$, $L^9$, $L^{10}$, $L^{11}$, $L^{12}$, P and B being of such composition and number that the chemical moiety can be induced to electrochemiluminesce and the total number of bonds to M' provided by the ligands of M' equals the coordination number of M', and; and the total number of bonds to M" provided by the ligands of M" equals the coordination number of M";

the system comprising:
  a) the chemical moiety;
  b) a means for contacting the chemical moiety with the analyte of interest to form a reagent mixture such that the B substance of the chemical moiety and the analyte are capable of binding with one another;
  c) a means for inducing the chemical moiety to electrochemiluminesce; and
  d) a means for detecting emitted luminescence.

109. The system of claim 108, wherein the reagent mixture comprises one or more different chemical moieties each of which can be induced to luminesce at a different wavelength, each moiety being attached to a different analyte of interest.

110. The system of claim 108, wherein the reagent mixture comprises one or more different chemical moieties each of which can be induced to luminesce by exposure to energy of a different value or from a different source, each moiety being bound to a different analyte of interest.

111. A composition which comprises a chemical moiety having the formula:

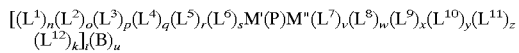

wherein:
  M' and M" are independently selected from ruthenium and osmium;
  $L^1$, $L^2$, $L^3$, $L^4$, $L^5$, and $L^6$ are ligands of M', each of which may be the same as or not the same as each other ligand;
  $L^7$, $L^8$, $L^9$, $L^{10}$, $L^{11}$, and $L^{12}$ are ligands of M", each of which may be the same as or not the same as each other ligand;
  P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;
  B is a substance which is attached to one or more of $L^1$, $L^2$, $L^3$, $L^4$, $L^5$, $L^6$, $L^7$, $L^8$, $L^9$, $L^{10}$, $L^{11}$, and $L^{12}$;
  each of n, o, p, q, r, s, v, w, x, y, z, and k is zero or an integer;
  t is an integer equal to or greater than 1;
  u is an integer equal to or greater than 1;
  $L^1$, $L^2$, $L^3$, $L^4$, $L^5$, $L^6$, $L^7$, $L^8$, $L^9$, $L^{10}$, $L^{11}$, $L^{12}$, P and B being of such composition and number that the chemical moiety can be induced to electrochemiluminesce and the total number of bonds to M' provided by the ligands of M' equals the coordination number of M', and; and the total number of bonds to M" provided by the ligands of M" equals the coordination number of M"; and
  one or more different chemical moieties each of which is capable of being induced to luminesce at a wavelength different from that at which any other of the chemical moieties luminesces.

112. The method of claim 111, wherein B is further defined as a substance covalently bound to one or more of $L^1$, $L^2$, $L^3$, $L^4$, $L^5$, $L^6$, $L^7$, $L^8$, $L^9$, $L^{10}$, $L^{11}$, or $L^{12}$ through one or more amide linkages.

113. The composition of claim 111, wherein B is a whole cell, subcellular particle, nucleic acid, polysaccharide, protein, lipoprotein, lipopolysaccharide, glycoprotein, polypeptide, amino acid, cellular metabolite, hormone, tranquilizer, barbiturate, alkaloid, steroid, vitamin, or non-biological polymer.

114. The composition of claim 113, wherein B is a serum-derived antibody or a monoclonal antibody.

115. The composition of claim 113, wherein B is a nucleotide or polynucleotide.

116. The composition of claim 113 wherein B is T4 thyroid hormone.

117. A method of determining the presence of a chemical moiety, the method comprising (a) forming a reagent mixture containing the chemical moiety, or the chemical moiety and an agent which upon exposure of the reagent mixture to electrochemical energy forms either a reductant or an oxidant, said chemical moiety having the formula:

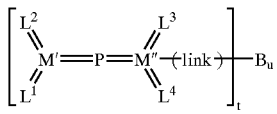

wherein:

M' and M" are metal ions;

$L^1$, $L^2$, $L^3$, and $L^4$ each is a bidentate aromatic heterocyclic nitrogen-containing ligand selected from the group consisting of bipyridyl, substituted bipyridyl, bipyrazyl, substituted bipyrazyl, terpyridyl, substituted terpyridyl, phenanthrolyl and substituted phenanthrolyl, wherein each of said substituted ligands is substituted by an alkyl, aryl, aralkyl, carboxylate, carboxaldehyde, carboxamide, cyano, amino, hydroxycarbonyl, hydroxyainino, aminocarbonyl, amidine, guanidinium, ureide, sulfur-containing group, phosphorus-containing group, or the carboxylate ester of N-hydroxysuccinimide, each of said ligands beings the same or not the same as each other ligand;

P is a bridging ligand selected from the group consisting of dpp, bbpe, bphb, α,ω-(2,2'-bipyrid-4-yl)-alkanes), 4,4'-bipyridines, and 1,2-bis(diphenylphosphine)ethane;

B is a biological substance, a synthetic substance which is capable of competing with a biological substance in a competitive binding reaction with a complementary material, or a non-biological polymer;

t is an integer equal to or greater than 1;

u is an integer equal to or greater than 1;

said link being covalent bonding linking B with at least one of $L^1$, $L^2$, $L^3$, and $L^4$;

$L^1$, $L^2$, $L^3$, $L^4$, P and B being of such composition and number that the chemical moiety is capable of being induced to electrochemiluminesce;

(b) exposing the reagent mixture to electrochemical energy the potential of which oscillates between a potential sufficiently positive to oxidize the chemical moiety and a potential sufficiently negative to reduce the chemical moiety, or to electrochemical energy such that said chemical moiety is oxidized and the agent forms a reductant, or such that said chemical moiety is reduced and the agent forms an oxidant, thereby to induce the chemical moiety to electrochemilaminesce; and (c) detecting emitted luminescence thereby to determine the presence of the chemical moiety.

* * * * *

UNITED STATES PATENT AND TRADEMARK OFFICE
CERTIFICATE OF CORRECTION

PATENT NO.    : 6,613,583 B1
DATED         : September 2, 2003
INVENTOR(S)   : Mark M. Richter et al.

It is certified that error appears in the above-identified patent and that said Letters Patent is hereby corrected as shown below:

Column 20,
Line 66, "compnsing" should read -- comprising --.

Column 27,
Lines 50-51, "M′ and; and" should read -- M´ ; and --.

Column 28,
Lines 41-42, "M′ and; and" should read -- M´ ; and --.

Column 29,
Line 12, "hormnone" should read -- hormone --.
Line 37, "1,2-bis(dipheriylphosphine)" should read -- 1,2-bis(diphenylphosphine) --.
Lines 50-51, "M′ and; and" should read -- M´ ; and --.

Column 31,
Lines 16-17 and 64-65, "M′ and; and" should read -- M´ ; and --.

Column 32,
Lines 50-51, "M′ and; and" should read -- M´ ; and --.

Column 33,
Line 30, "hydroxyainino" should read -- hydroxyamino --;

Column 34,
Line 28, "electrochemilaminesce" should read -- electorchemiluminesce --.

Signed and Sealed this

Twenty-first Day of December, 2004

JON W. DUDAS
*Director of the United States Patent and Trademark Office*